(12) United States Patent
Sengupta et al.

(10) Patent No.: US 11,356,299 B2
(45) Date of Patent: Jun. 7, 2022

(54) TRANSMISSION TECHNIQUES OVER DELAY-DOPPLER CHANNELS

(71) Applicant: QUALCOMM Incorporated, San Diego, CA (US)

(72) Inventors: Ayan Sengupta, San Diego, CA (US); Alberto Rico Alvarino, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/217,667

(22) Filed: Mar. 30, 2021

(65) Prior Publication Data

US 2021/0314194 A1 Oct. 7, 2021

Related U.S. Application Data

(60) Provisional application No. 63/006,617, filed on Apr. 7, 2020.

(51) Int. Cl.
*H04L 25/02* (2006.01)
*H04B 7/0456* (2017.01)
*H04L 5/00* (2006.01)
*H04L 27/26* (2006.01)

(52) U.S. Cl.
CPC ......... *H04L 25/022* (2013.01); *H04B 7/0456* (2013.01); *H04L 5/0016* (2013.01); *H04L 27/2697* (2013.01)

(58) Field of Classification Search
CPC . H04L 25/022; H04L 5/0048; H04L 27/2697; H04L 5/0016; H04L 27/2634; H04L 27/36; H04L 5/0007; H04B 7/0456; H04B 7/0617; H04B 7/02; H04B 7/0413; H04B 7/0695; H04B 7/088
See application file for complete search history.

(56) References Cited

U.S. PATENT DOCUMENTS

| | | | |
|---|---|---|---|
| 2006/0133523 A1* | 6/2006 | Stojanovic | ........ H04L 27/26265 375/295 |
| 2015/0043683 A1* | 2/2015 | Kato | ................... H04L 27/2649 375/340 |
| 2016/0072560 A1* | 3/2016 | Fukawa | ............... H04B 7/0842 375/267 |
| 2019/0123788 A1* | 4/2019 | Park | ..................... H04B 7/0413 |
| 2019/0181928 A1* | 6/2019 | Pan | .......................... H04B 7/02 |

* cited by examiner

*Primary Examiner* — Khanh C Tran
(74) *Attorney, Agent, or Firm* — Holland & Hart LLP

(57) ABSTRACT

Methods, systems, and devices for wireless communications are described. Generally, a transmitting device may send transmissions using a first numerology for a first type of user equipment (UE). The transmitting device may partition a stream of modulated data symbol tones into one or more contiguous subsets of modulated data symbol tones that result in a roughly frequency-flat channel for a second type of UE. The transmitting device may then perform precoding on individual subsets of the one or more contiguous subsets of modulated data symbol tones, and may insert a frequency-domain cyclic prefix, cyclic postfix, or guard interval after each precoded subset. Thus, the first type of UE may communicate using the first numerology and the second type of UE may communicate using the first numerology but with the frequency-domain cyclic prefixes to address doppler spread experienced by the second type of UE.

30 Claims, 18 Drawing Sheets

TRANSMISSION TECHNIQUES OVER DELAY-DOPPLER CHANNELS

CROSS REFERENCE

The present Application for Patent claims the benefit of U.S. Provisional Patent Application No. 63/006,617 by SENGUPTA et al., entitled "TRANSMISSION TECHNIQUES OVER DELAY-DOPPLER CHANNELS," filed Apr. 7, 2020, assigned to the assignee hereof, and expressly incorporated by reference herein.

FIELD OF TECHNOLOGY

The following relates generally to wireless communications and more specifically to transmission techniques over delay-doppler channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, base stations may communicate with various types of UEs.

SUMMARY

The described techniques relate to improved methods, systems, devices, and apparatuses that support transmission techniques over delay-doppler channels. Generally, a transmitting device (e.g., a base station) may communicate with various types of UEs (e.g., type-1 and type-2 UEs) using a chunk-based transmission strategy. In a chunk-based transmission strategy, a stream of tones that includes modulated data symbols may be partitioned into contiguous subsets of modulated data symbol tones (which may also be referred to as "chunks"). The use of the chunk-based transmission strategy may allow for efficient transmissions to both type-1 and type-2 UEs. A first type of UE (e.g., a type-1 UE) may be capable of receiving high-powered transmissions from tall, line-of sight base stations. A second type of UE (e.g., a type-2 UE) may be a highly mobile UE in an urban scenario. In the described techniques, the transmitting device may send transmissions using a first numerology for type-1 UEs. However, by partitioning the stream of modulated data symbol tones into chunks—or one or more contiguous subsets of modulated data symbol tones—the transmission may also be received by type-2 UEs in a roughly frequency-flat channel. In the chunk-based transmission strategy, the transmitting device may perform precoding on individual sets or subsets of subcarriers, and may insert a frequency-domain cyclic prefix or guard interval before or after each precoded subset of subcarriers. Thus, type-1 UEs may communicate using the first numerology, which is efficient for type-1 UEs. Type-2 UEs may use time-domain equalization for detection, and may communicate using the first numerology but with the frequency-domain cyclic prefixes to address the doppler spread experienced by type-2 UEs.

A method for wireless communications at a transmitting wireless device is described. The method may include partitioning a stream of tones including modulated data symbols into one or more contiguous subsets of modulated data symbol tones, precoding individual subsets of the one or more contiguous subsets of modulated data symbol tones so as to generate one or more precoded tone subsets, adding one or more additional tones to the one or more precoded tone subsets so as to generate one or more expanded precoded tone subsets, mapping the one or more expanded precoded tone subsets to resource elements, generating a time-domain data stream based on the resource elements, and transmitting the time-domain data stream.

An apparatus for wireless communications at a transmitting wireless device is described. The apparatus may include a processor, memory coupled with the processor, and instructions stored in the memory. The instructions may be executable by the processor to cause the apparatus to partition a stream of tones including modulated data symbols into one or more contiguous subsets of modulated data symbol tones, precode individual subsets of the one or more contiguous subsets of modulated data symbol tones so as to generate one or more precoded tone subsets, add one or more additional tones to the one or more precoded tone subsets so as to generate one or more expanded precoded tone subsets, map the one or more expanded precoded tone subsets to resource elements, generate a time-domain data stream based on the resource elements, and transmit the time-domain data stream.

Another apparatus for wireless communications at a transmitting wireless device is described. The apparatus may include means for partitioning a stream of tones including modulated data symbols into one or more contiguous subsets of modulated data symbol tones, means for precoding individual subsets of the one or more contiguous subsets of modulated data symbol tones so as to generate one or more precoded tone subsets, means for adding one or more additional tones to the one or more precoded tone subsets so as to generate one or more expanded precoded tone subsets, means for mapping the one or more expanded precoded tone subsets to resource elements, means for generating a time-domain data stream based on the resource elements, and means for transmitting the time-domain data stream.

A non-transitory computer-readable medium storing code for wireless communications at a transmitting wireless device is described. The code may include instructions executable by a processor to partition a stream of tones including modulated data symbols into one or more contiguous subsets of modulated data symbol tones, precode individual subsets of the one or more contiguous subsets of modulated data symbol tones so as to generate one or more precoded tone subsets, add one or more additional tones to the one or more precoded tone subsets so as to generate one or more expanded precoded tone subsets, map the one or more expanded precoded tone subsets to resource elements, generate a time-domain data stream based on the resource elements, and transmit the time-domain data stream.

Some examples of the method, apparatuses, and non-transitory computer-readable medium described herein may further include operations, features, means, or instructions for transmitting, to a receiving wireless device, system information or control signaling including an indication that the transmitting wireless device may be to use a transmission scheme that includes precoding individual subsets of the one or more contiguous subsets of modulated data symbol tones.

Some examples of the method, apparatuses, and non-transitory computer-readable medium described herein may further include operations, features, means, or instructions for transmitting, with the system information or control signaling, one or more transmission parameters for the transmission scheme.

In some examples of the method, apparatuses, and non-transitory computer-readable medium described herein, the one or more transmission parameters include an indication of at least one of a number of the one or more contiguous subsets of modulated data symbol tones, an indication of the one or more additional tones, an indication of a signal structure or mapping associated with the one or more additional tones, an indication of the precoding to be used on the individual subsets of the one or more contiguous subsets of modulated data symbol tones, one or more reference signal locations, an indication of one or more transmission configurations, a configuration of superimposed data streams associated with the modulated data symbols, or a combination thereof.

Some examples of the method, apparatuses, and non-transitory computer-readable medium described herein may further include operations, features, means, or instructions for identifying that an updated transmission parameter is to be used, transmitting a notification that the system information is to be updated based on the identification of the updated transmission parameter, and transmitting the updated system information with the updated transmission parameter.

In some examples of the method, apparatuses, and non-transitory computer-readable medium described herein, the one or more transmission parameters may be indicated via a bitmap or one of a set of one or more indices associated with pre-defined combinations of the one or more transmission parameters.

In some examples of the method, apparatuses, and non-transitory computer-readable medium described herein, the transmission scheme includes a broadcast transmission scheme, and transmitting the data signal includes transmitting a broadcast signal to a set of one or more receiving devices.

In some examples of the method, apparatuses, and non-transitory computer-readable medium described herein, the transmission scheme includes a unicast transmission scheme, and transmitting the data signal includes transmitting a unicast signal to a receiving device.

Some examples of the method, apparatuses, and non-transitory computer-readable medium described herein may further include operations, features, means, or instructions for receiving control information including an indication of one or more transmission parameters for processing of the stream of tones.

Some examples of the method, apparatuses, and non-transitory computer-readable medium described herein may further include operations, features, means, or instructions for communicating, via a configuration message, an indication of one or more transmission parameters associated with a set of one or more transmission time intervals.

In some examples of the method, apparatuses, and non-transitory computer-readable medium described herein, communicating the configuration message may further include operations, features, means, or instructions for transmitting the configuration message to a receiving device.

In some examples of the method, apparatuses, and non-transitory computer-readable medium described herein, the one or more transmission parameters include a coding scheme for the one or more precoded tone subsets, and precoding the individual subsets of the one or more contiguous subsets of modulated data symbol tones may be based on the coding scheme.

In some examples of the method, apparatuses, and non-transitory computer-readable medium described herein, the one or more transmission parameters include a number of superimposed data streams for each precoded tone subset of the one or more precoded tone subsets, and a power value for each of the superimposed data streams.

In some examples of the method, apparatuses, and non-transitory computer-readable medium described herein, the one or more transmission parameters include different transmission parameters for different superimposed data streams.

In some examples of the method, apparatuses, and non-transitory computer-readable medium described herein, the different transmission parameters for different superimposed data streams may be determined based on a coding scheme associated with each precoded tone subset of the one or more precoded tone subsets.

In some examples of the method, apparatuses, and non-transitory computer-readable medium described herein, the one or more transmission parameters vary over the set of one or more transmission time intervals.

In some examples of the method, apparatuses, and non-transitory computer-readable medium described herein, the configuration message includes a radio resource control message.

In some examples of the method, apparatuses, and non-transitory computer-readable medium described herein, adding the one or more additional tones may include operations, features, means, or instructions for generating at least one of a frequency-domain cyclic prefix or a frequency-domain cyclic postfix including the one or more additional tones for each expanded precoded tone subset of the one or more expanded precoded tone subsets.

In some examples of the method, apparatuses, and non-transitory computer-readable medium described herein, the one or more additional tones include null tones.

In some examples of the method, apparatuses, and non-transitory computer-readable medium described herein, the one or more additional tones include pilot tones.

In some examples of the method, apparatuses, and non-transitory computer-readable medium described herein, a number of modulated data symbol tones in each subset of modulated data symbol tones may be equal to a power of two.

In some examples of the method, apparatuses, and non-transitory computer-readable medium described herein, a first subset of modulated data symbol tones or a last subset of modulated data symbol tones of the one or more contiguous subsets of modulated data symbol tones may be a different size from the rest of the one or more contiguous subsets of modulated data symbol tones.

In some examples of the method, apparatuses, and non-transitory computer-readable medium described herein, precoding the individual subsets of the one or more contiguous subsets of modulated data symbol tones may include operations, features, means, or instructions for precoding the individual subsets according to one or more coding schemes.

In some examples of the method, apparatuses, and non-transitory computer-readable medium described herein, the one or more coding schemes may include a discrete Fourier transform spreading operation, an identity matrix multiplication operation, or both.

In some examples of the method, apparatuses, and non-transitory computer-readable medium described herein, adding the one or more additional tones to the one or more precoded tone subsets may include operations, features, means, or instructions for adding one or more unidirectional tones to the one or more precoded tone subsets, or adding one or more bidirectional tones to the one or more precoded tone subsets, interleaving one or more tones with the one or more precoded tone subsets, or a combination thereof.

In some examples of the method, apparatuses, and non-transitory computer-readable medium described herein, mapping the one or more expanded precoded tone subsets to resource elements may include operations, features, means, or instructions for applying an offset value which may be based on a symbol or slot index.

In some examples of the method, apparatuses, and non-transitory computer-readable medium described herein, the one or more contiguous subsets of modulated data symbol tones, the one or more additional tones, or both, includes one or more of a first type of reference signal tones, one or more of a second type of reference signal tones, or both, the first type of reference signal tones may be interleaved with modulated data symbol tones of a subset of modulated data symbol tones, and, and the second type of reference signal tones includes at least one adjacent gap tone within a subset of modulated data symbol tones.

In some examples of the method, apparatuses, and non-transitory computer-readable medium described herein, the presence of the first type of reference signal tones or the presence of the second type of reference signal tones, or both, in the contiguous subsets of modulated data symbol tones, the one or more additional tones, or both, may be based on precoding the individual subsets of the one or more contiguous subsets of modulated data symbol tones using a first coding scheme, a second coding scheme, or both.

In some examples of the method, apparatuses, and non-transitory computer-readable medium described herein, the first coding scheme includes a discrete Fourier transform spreading operation, and the second coding scheme includes an identity matrix multiplication operation.

In some examples of the method, apparatuses, and non-transitory computer-readable medium described herein, receiving the stream of tones including the modulated data symbols may include operations, features, means, or instructions for receiving a superposition of a first layer data stream and a second layer data stream.

In some examples of the method, apparatuses, and non-transitory computer-readable medium described herein, generating the time-domain data stream based on the resource elements may include operations, features, means, or instructions for sample appending at least one of a cyclic prefix, a pilot sample, a blank sample, or combinations thereof.

In some examples of the method, apparatuses, and non-transitory computer-readable medium described herein, generating the time-domain data stream based on the resource elements may include operations, features, means, or instructions for refraining from sample appending.

A method for wireless communications at a receiving wireless device is described. The method may include receiving a data stream from a transmitting wireless device, converting the data stream into a frequency-domain representation of resource elements, decoding the resource elements into one or more contiguous subsets of modulated data symbol tones, and identifying data received via the one or more contiguous subsets of modulated data symbol tones.

An apparatus for wireless communications at a receiving wireless device is described. The apparatus may include a processor, memory coupled with the processor, and instructions stored in the memory. The instructions may be executable by the processor to cause the apparatus to receive a data stream from a transmitting wireless device, convert the data stream into a frequency-domain representation of resource elements, decode the resource elements into one or more contiguous subsets of modulated data symbol tones, and identify data received via the one or more contiguous subsets of modulated data symbol tones.

Another apparatus for wireless communications at a receiving wireless device is described. The apparatus may include means for receiving a data stream from a transmitting wireless device, means for converting the data stream into a frequency-domain representation of resource elements, means for decoding the resource elements into one or more contiguous subsets of modulated data symbol tones, and means for identifying data received via the one or more contiguous subsets of modulated data symbol tones.

A non-transitory computer-readable medium storing code for wireless communications at a receiving wireless device is described. The code may include instructions executable by a processor to receive a data stream from a transmitting wireless device, convert the data stream into a frequency-domain representation of resource elements, decode the resource elements into one or more contiguous subsets of modulated data symbol tones, and identify data received via the one or more contiguous subsets of modulated data symbol tones.

Some examples of the method, apparatuses, and non-transitory computer-readable medium described herein may further include operations, features, means, or instructions for receiving, from the transmitting wireless device, system information or control signaling including an indication that the transmitting wireless device may be to use a transmission scheme that includes precoding individual subsets of the one or more contiguous subsets of modulated data symbol tones.

Some examples of the method, apparatuses, and non-transitory computer-readable medium described herein may further include operations, features, means, or instructions for receiving, with the system information or control signaling, one or more transmission parameters for the transmission scheme.

In some examples of the method, apparatuses, and non-transitory computer-readable medium described herein, the one or more transmission parameters include an indication of at least one of a number of the one or more contiguous subsets of modulated data symbol tones, an indication of one or more additional tones added to the one or more contiguous subsets of modulated data symbol tones, an indication of a signal structure or mapping associated with the one or more additional tones, an indication of precoding used on the one or more contiguous subsets of modulated data symbol tones, one or more reference signal locations, an indication of one or more transmission configurations, a configuration of superimposed data streams associated with the modulated data symbols, or a combination thereof.

Some examples of the method, apparatuses, and non-transitory computer-readable medium described herein may further include operations, features, means, or instructions for receiving a notification that the system information is to be updated in order to receive an updated transmission parameter and receiving the updated system information with the updated transmission parameter.

In some examples of the method, apparatuses, and non-transitory computer-readable medium described herein, the one or more transmission parameters may be indicated via a bitmap or one of a set of one or more indices associated with pre-defined combinations of the one or more transmission parameters.

In some examples of the method, apparatuses, and non-transitory computer-readable medium described herein, the transmission scheme includes a broadcast transmission scheme, and transmitting the data signal includes transmitting a broadcast signal to a set of one or more receiving devices.

In some examples of the method, apparatuses, and non-transitory computer-readable medium described herein, the transmission scheme includes a unicast transmission scheme, and transmitting the data signal includes transmitting a unicast signal to a receiving device.

Some examples of the method, apparatuses, and non-transitory computer-readable medium described herein may further include operations, features, means, or instructions for transmitting control signaling including an indication of one or more transmission parameters for precoding the individual subsets of the one or more contiguous subsets of modulated data symbols, where decoding the resource elements into the one or more contiguous subsets of modulated data symbol tones may be based on the indication of the one or more transmission parameters.

Some examples of the method, apparatuses, and non-transitory computer-readable medium described herein may further include operations, features, means, or instructions for communicating, via a configuration message, an indication of one or more transmission parameters associated with a set of one or more transmission time intervals.

In some examples of the method, apparatuses, and non-transitory computer-readable medium described herein, communicating the configuration message may further include operations, features, means, or instructions for receiving the configuration message from a transmitting device.

In some examples of the method, apparatuses, and non-transitory computer-readable medium described herein, the one or more transmission parameters include a coding scheme used for precoding individual subsets of the one or more contiguous subsets of modulated data symbol tones into one or more precoded tone subsets.

In some examples of the method, apparatuses, and non-transitory computer-readable medium described herein, the one or more transmission parameters include a number of superimposed data streams for each precoded tone subset of the one or more precoded tone subsets, and a power value for each of the superimposed data streams.

In some examples of the method, apparatuses, and non-transitory computer-readable medium described herein, the one or more transmission parameters include different transmission parameters for different superimposed data streams.

In some examples of the method, apparatuses, and non-transitory computer-readable medium described herein, the different transmission parameters for different superimposed data streams may be determined based on a coding scheme associated with each precoded tone subset of the one or more precoded tone subsets.

In some examples of the method, apparatuses, and non-transitory computer-readable medium described herein, the one or more transmission parameters vary over the set of one or more transmission time intervals.

In some examples of the method, apparatuses, and non-transitory computer-readable medium described herein, the configuration message includes a radio resource control message.

In some examples of the method, apparatuses, and non-transitory computer-readable medium described herein, receiving the data stream from the transmitting wireless device may include operations, features, means, or instructions for detecting the data stream via frequency-domain equalization when the receiving wireless device may be using a first numerology or via time-domain equalization when the receiving wireless device may be using a second numerology, where the first numerology includes a smaller subcarrier spacing and a larger cyclic prefix compared to the second numerology.

DETAILED DESCRIPTION

Figure 1:
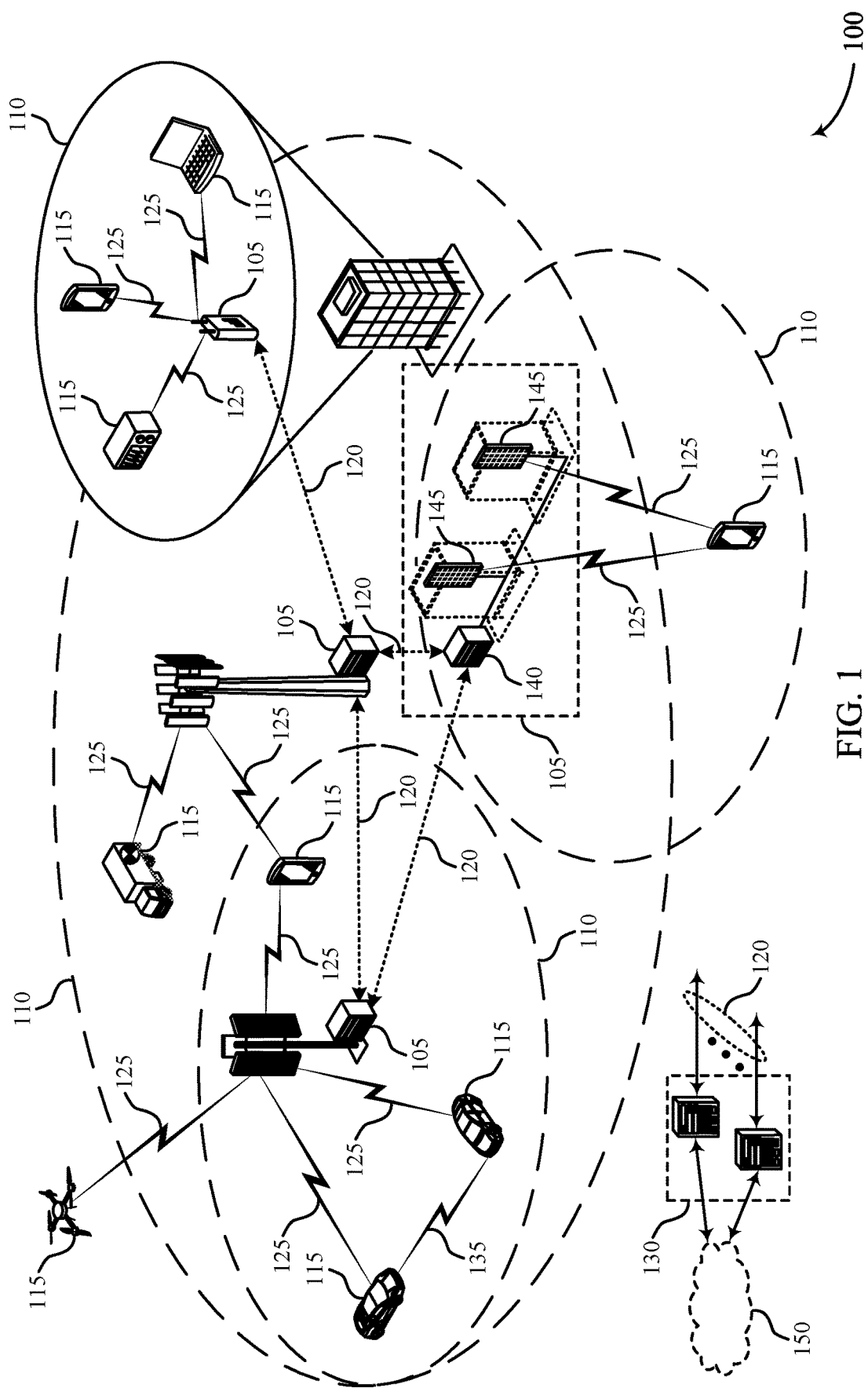
FIG. 1 illustrates an example of a system for wireless communications that supports transmission techniques over delay-doppler channels in accordance with aspects of the present disclosure.

In some examples of a wireless communications system, one or more base stations may communicate with one or more UEs. The base stations may communicate via a single frequency network (SFN). In some examples, one or more cooperating transmitters (e.g., base stations) may communicate across large geographical areas including one or more sparsely located base stations. Such base stations may be sub-urban or rural base stations that are physically tall and capable of sending high powered transmissions over long distances. The geographical area may include densely located base stations. Such base stations may be urban base stations that are physically short and located throughout various structures, within a city or densely populated area, or the like. These various types of base stations may communicate with different types of UEs.

A first type of UE (e.g., a type-1 UE) may be capable of receiving high-powered transmissions from tall, line-of-sight base stations. For instance, type-1 UEs may be fixed rooftop receivers having a line-of-sight to a high-tower base station transmitting high-powered transmissions. Type-1 UEs may experience limited doppler spread, but large delay spread. Thus, type-1 UEs may operate at a high efficiency using a first numerology associated with type-1 UEs. The first numerology may be an OFDM numerology with a time-domain cyclic prefix long enough to cover the large delay spread of a channel, and a large symbol duration with smaller subcarrier spacing to minimize the cyclic prefix overhead.

A second type of UE (e.g., a type-2 UE) may be a highly mobile UE in an urban scenario. For example, a type-2 UE may be an in-car UE communicating with urban cells (e.g., via base stations). As a result of its highly mobile use case, a type-2 UE may experience a small delay spread but a large doppler spread (e.g., a large change in channel conditions over time). Thus, type-2 UEs may operate at a high efficiency using a second numerology associated with type-2 UEs. The second numerology may be an OFDM numerology with larger subcarrier spacing than the first numerology to address the high doppler spread, but a shorter symbol duration and shorter cyclic prefix because the of the small delay spread experienced by type-2 UEs.

In some examples, if one or more base stations attempt to communicate with both types of UEs using a single numerology, a wireless communications system may experience decreased throughput, increased system latency, and decreased user experience. For example, a base station may implement a time-division multiplexing (TDM) scheme for the first numerology and the second numerology such that some TTIs are allocated for communications using the first numerology and some TTIs are allocated for communications using the second numerology. However, such a TDM scheme may result in a significant decrease in throughput (e.g., a decrease in throughput close to or equal to a factor of two). In some examples, a base station may operate using a multi-frequency network (MFN) by using a frequency-domain multiplexing (FDM) scheme using the different numerologies. However, such an FDM scheme may result in a similar decrease in throughput. In some examples, wireless communications system 200 may support a numerology that is configured to support both types of UE. For example, a numerology may include a large time-domain cyclic prefix to cater to type-1 UEs and a large subcarrier spacing with a relatively small symbol duration to cater to type-2 UEs. However, such a numerology may have a prohibitively large overhead in terms of a time-domain cyclic prefix to symbol duration ratio, which may also reduce throughput for both types of UE.

Instead, a transmitting device (e.g., a base station) may communicate with both types of UE using a chunk-based transmission strategy. The transmitting device may send transmissions using the first numerology for type-1 UEs. However, the transmitting device may also determine one or more subsets of contiguous subcarriers that result in a roughly frequency-flat channel for type-2 UEs. The transmitting device may then perform precoding on each of the subsets of contiguous subcarriers, and may insert a frequency-domain cyclic prefix or cyclic postfix, or a guard interval after each precoded subset of contiguous subcarriers by adding additional tones to each subset of contiguous subcarriers. Thus, base stations may communicate with type-1 UEs and type-2 UEs using the first numerology, which is efficient for type-1 UEs. Type-2 UEs may use time-domain equalization for detection, and may communicate with the base stations using the first numerology. However, type-2 UEs may leverage the frequency-domain cyclic prefixes or postfixes inserted into each precoded subset of contiguous subcarriers to address the doppler spread experienced by type-2 UEs.

Aspects of the disclosure are initially described in the context of wireless communications systems. Aspects of the disclosure are further illustrated by and described with reference to transmission schemes and process flows. Aspects of the disclosure are further illustrated by and described with reference to apparatus diagrams, system diagrams, and flowcharts that relate to transmission techniques over delay-doppler channels.

FIG. 1 illustrates an example of a wireless communications system 100 that supports transmission techniques over delay-doppler channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of one or more carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more TDM techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., a set of one or more subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may communicate with various types of UEs 115 using a chunk-based transmission strategy. The base station may send transmissions using a first numerology. However, the base station may also partition a stream of modulated data symbol tones into subsets, individually precode each subset, and insert a frequency-domain cyclic prefix, postfix, or guard interval after each precoded subset of subcarriers by adding additional tones to each subset of subcarriers.

Figure 2:
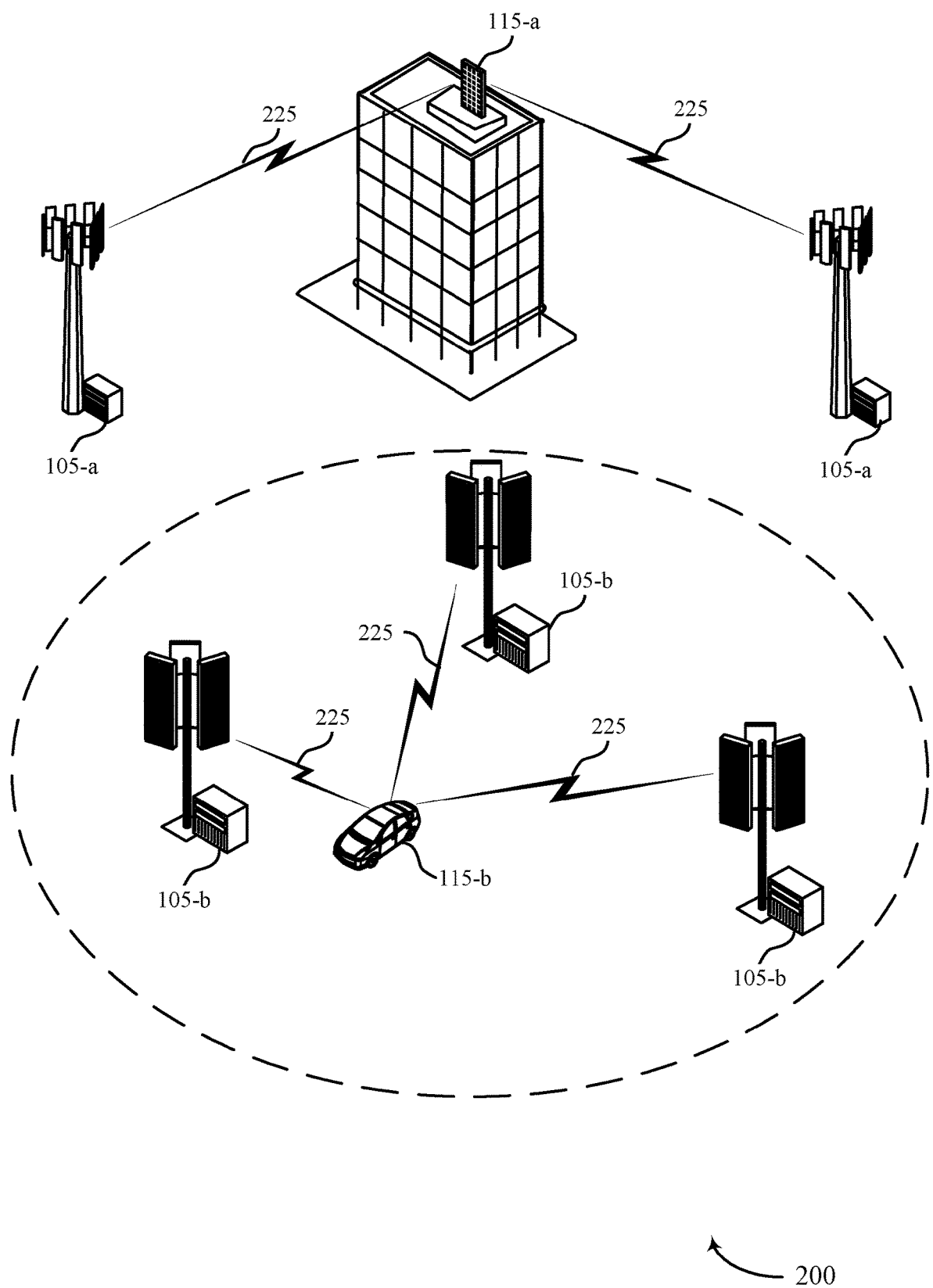
FIG. 2 illustrates an example of a wireless communications system that supports transmission techniques over delay-doppler channels in accordance with aspects of the present disclosure.

FIG. 2 illustrates an example of a wireless communications system 200 that supports transmission techniques (e.g., for terrestrial broadcasts) over delay-doppler channels in accordance with aspects of the present disclosure. In some examples, wireless communications system 200 may implement aspects of wireless communication system 100. Wireless communications system 200 may include examples of UEs 115 and base stations 105 which may be examples of corresponding devices as described with reference to FIG. 1.

In some examples of a wireless communications system, one or more base stations 105 may communicate with one or more UEs 115. Wireless communications system 200 may support a single frequency network (SFN). In some examples, one or more cooperating transmitters (e.g., base stations 105) may communicate across large geographical areas. Wireless communications system 200 may include one or more sparsely located base stations 105-a. Base stations 105-a may be sub-urban or rural base stations 105 that are physically tall and capable of sending high powered transmissions over long distances. Wireless communications system 200 may also include densely located base stations 105-b. Base stations 105-b may be urban base stations 105 that are physically short and located throughout various structures, within a city or densely populated area, or the like. Such base stations 105-a and base stations 105-b may communicate with different types of UEs.

A first type of UE 115 (e.g., a type-1 UE 115-a) may be capable of receiving high-powered transmissions from tall, line-of-sight base stations 105-a. For instance, UEs 115-a may be fixed rooftop receivers having a line-of-sight to a high-tower base station 105-a transmitting high-powered transmissions over wireless communication links 225. UEs 115-a may experience limited doppler spread, but large delay spread. That is, signals transmitted across great distances at a high power between stationary devices (e.g., a tall base station 105 and a roof-top UE 115-a) may experience timing delays but the channel conditions may remain relatively stable (e.g., may experience a small doppler spread). Thus, UEs 115-a may operate at a high efficiency using a first numerology associated with UEs 115-a. The first numerology may be an OFDM numerology with a time-domain cyclic prefix long enough to cover the large delay spread of a channel, and a large symbol duration with smaller subcarrier spacing to minimize the cyclic prefix overhead.

A second type of UE 115 (e.g., a type-2 UE 115-b) may be a highly mobile UE 115 in an urban scenario. For example, a UE 115-b may be an in-car UE 115 communicating with urban cells (e.g., via base stations 105-b). Base stations 105-b may be low-profile or shorter base stations that are densely populated in wireless communications system 200. As a result of its highly mobile use case, a UE 115-b may experience a small delay spread but a large doppler spread (e.g., a large change in channel conditions over time). Thus, UEs 115-b may operate at a high efficiency using a second numerology associated with UEs 115-b. The second numerology may be an OFDM numerology with larger subcarrier spacing than the first numerology to address the high doppler spread, but a shorter symbol duration and shorter cyclic prefix because the of the small delay spread experienced by UEs 115-b.

In some examples, if one or more base stations 105 attempt to communicate with both types of UEs 115 (e.g., UEs 115-*a* and UEs 115-*b*) using a single numerology, wireless communications system 200 may experience decreased throughput, increased system latency, and decreased user experience. For example, wireless communications system 200 may implement a TDM scheme for the first numerology and the second numerology such that some TTIs are allocated for communications using the first numerology and some TTIs are allocated for communications using the second numerology. However, such a TDM scheme may result in a significant decrease in throughput (e.g., a decrease in throughput close to or equal to a factor of two) because each type of UE 115 is only able to communicate using up to half of available resources. In some examples, wireless communications system 200 may operate using an MFN based on employing an FDM scheme that uses the different numerologies. However, such an FDM scheme may result in a similar decrease in throughput. In some examples, wireless communications system 200 may support a numerology that is configured to support both types of UE 115. For example, a numerology may include a large time-domain cyclic prefix to cater to UEs 115-*a* and a large subcarrier spacing with a relatively small symbol duration to cater to UEs 115-*b*. However, such a numerology may have a prohibitively large overhead in terms of a time-domain cyclic prefix to symbol duration ratio, which may also reduce throughput for both types of UE 115.

Instead, as described in greater detail with reference to FIG. 3, a transmitting device (e.g., a base station 105-*a* or a base station 105-*b*) may communicate with both UEs 115-*a* and UEs 115-*b* using a chunk-based transmission strategy. The transmitting device may send transmissions using the first numerology for UEs 115-*a*. However, the transmitting device may also determine one or more subsets of contiguous subcarriers that result in a roughly frequency-flat channel for UEs 115-*b*. The transmitting device may then perform precoding on each of the subsets of contiguous subcarriers, and may insert a frequency-domain cyclic prefix or guard interval after each precoded subset of contiguous subcarriers by adding additional tones to each subset of contiguous subcarriers. Thus, base stations 105 may communicate with UEs 115-*a* and 115-*b* using the first numerology, which is efficient for UEs 115-*a*. UEs 115-*b* may use time-domain equalization for detection, and may communicate with the base stations 105 using the first numerology. However, UEs 115-*b* may leverage the frequency-domain cyclic prefixes inserted into each precoded subset of contiguous subcarriers to address the doppler spread experienced by UEs 115-*b*.

Figure 3:
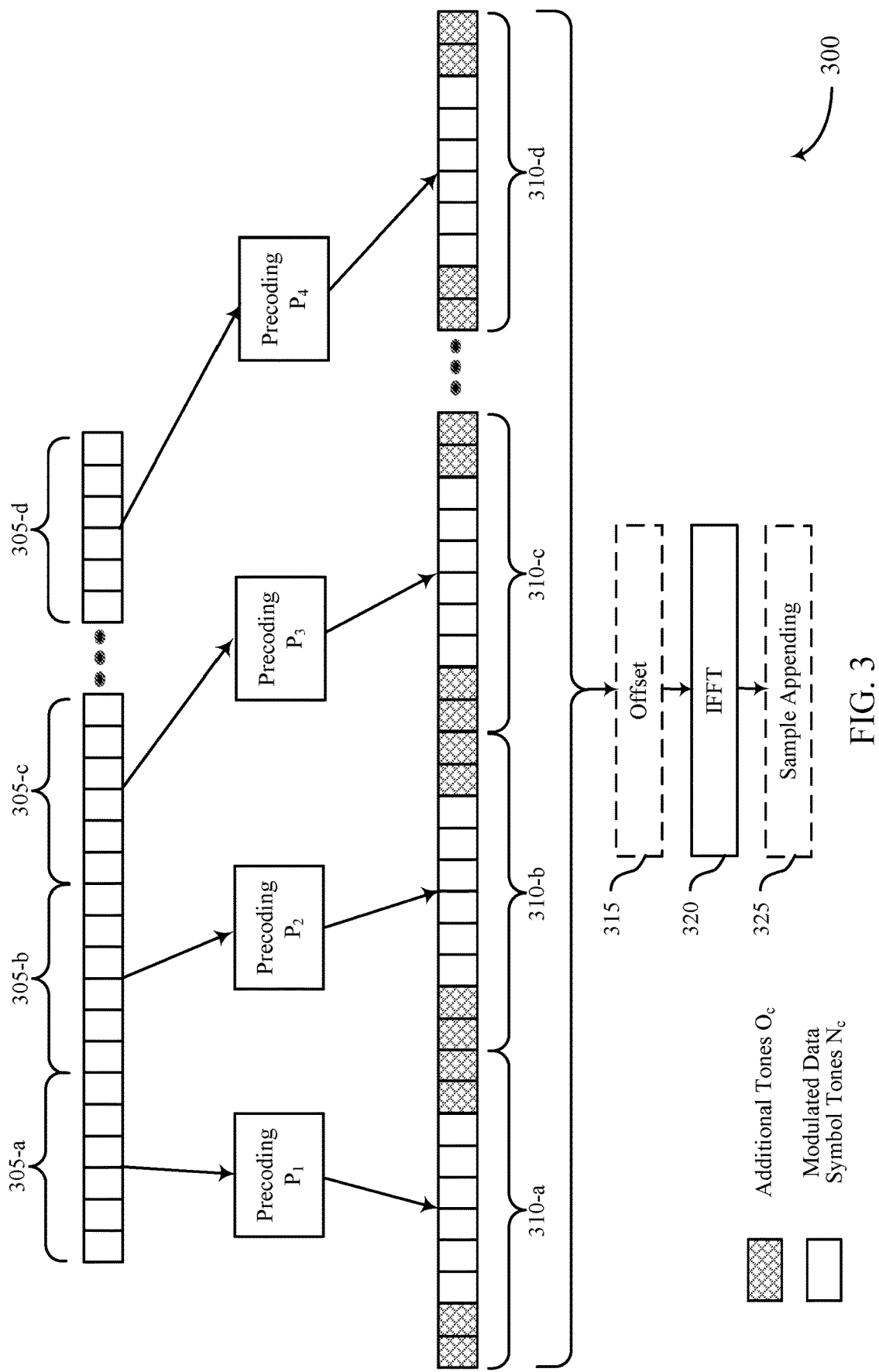
FIG. 3 illustrates an example of a transmission scheme that supports transmission techniques over delay-doppler channels in accordance with aspects of the present disclosure.

FIG. 3 illustrates an example of a transmission scheme 300 that supports transmission techniques (e.g., for terrestrial broadcast) over delay-doppler channels in accordance with aspects of the present disclosure. In some examples, transmission scheme 300 may implement aspects of wireless communication system 100. Transmission scheme 300 may be implemented by one or more base stations 105 and one or more UEs 115, which may be examples of corresponding devices as described with reference to FIGS. 1 and 2.

In some examples, a transmitting device may communicate with a receiving device using a first numerology, and may precode individual subsets of subcarriers including an initial subset of subcarriers and additional tones. For example, a transmitting device (e.g., a base station 105) may communicate with one or more receiving devices (e.g., UEs 115-*a* and UEs 115-*b*, as described in greater detail with reference to FIG. 2) as described herein.

A transmitting device may receive (e.g., from a transmit chain) a stream of tones (e.g., modulated data symbols for a transmission) for sending a transmission (e.g., a data transmission). The transmitting device may partition the stream of tones into one or more contiguous subsets 305 (e.g., K subsets) of modulated data symbol tones. In some examples, the transmitting device may partition the stream of tones into a single subset 305. For example, the transmitting device may partition the entire stream of tones into a subset 305-*a*. In some other examples, the transmitting device may partition the stream of tones into multiple contiguous subsets. For example, the transmitting device may partition the stream of tones into subsets 305-*a*, 305-*b*, 305-*c*, 305-*d*, or a combination thereof.

Subsets 305 may include data modulation symbols, pilot tones, blank subcarriers, or a combination thereof. For instance, one or more subsets 305 may include one or more types of pilot tones, as described in greater detail with reference to FIG. 4. Each subset 305 may include a number (e.g., $N_c$) of modulated data symbol tones. In some examples, the transmitting device may select values for $N_c$ which are equal to a power of two. In some examples, each subset 305 may include the same number $N_c$ of modulated data symbol tones. In some examples, one or more subset 305 may include different numbers $N_c$ of modulated data symbol tones. For instance (e.g., if a total number of modulated data symbol tones do not divide evenly across all subsets 305) a first subset (e.g., subset 305-*a*) or a final subset (e.g., subset 305-*d*) may include a different number $N_c$ of modulated data symbol tones from a remainder of the subsets 305. Thus, the stream of tones $K \times N_c$ may be partitioned into K subsets 305 of subcarriers. Each subset 305 may result in a relatively frequency-flat channel when received by UEs 115-*b*.

The transmitting device may separately precode each subset 305. That is, the transmitting device may apply precoding $P_1$ to subset 305-*a*, may apply precoding $P_2$ to subset 305-*b*, may apply precoding $P_3$ to subset 305-*c*, and so forth for each subset 305 up to applying precoding $P_4$ to subset 305-*d*. In some examples, the transmitting device may apply one coding scheme to one or more of the subsets 305 and a different coding scheme to other subsets 305. For instance, the transmitting device may perform a discrete Fourier transform spreading operation on subsets 305, and may perform an identity matrix multiplication operation on other subsets 305. That is, some precoders may be a discrete Fourier transform matrix $F_{N_c}$, while other precoders may be identity matrices. Such precoders may be applied to different subsets 305. When performing an identity matrix multiplication, the transmitting device may apply an identity matrix to an input, such that the output of the identity multiplication is equal to the input.

The transmitting device may add one or more additional tones to each precoded subset 305. That is, the transmitting device may generate one or more expanded precoded tone subsets 310. Each expanded precoded tone subset 310 may correspond to a subset 305, and may include one or more additional tones $O_{c_i}$ where c refers to a subset 305, and i refers to a subset 305 index. That is, for a first subset (e.g., subset 305-*a*) having an index i=1, the transmitting device may add one or more additional tones $O_{c_1}$. For a second subset (e.g., subset 305-*b*) having an index i=2, the transmitting device may add one or more additional tones $O_{c_2}$. For K subsets 305, the transmitting device may append respective additional tones $O_{c_0}$-$O_{c_{K-1}}$. For instance, the transmitting device may apply precoding $P_1$ to subset 305-*a* and may add one or more additional tones $O_c$ to the precoded subset 305-*a* to generate more expanded precoded tone subsets 310-*a*. The transmitting device may similarly generate expanded precoded tone subsets 310-b, expanded precoded tone subsets 310-c, and so on up to final expanded precoded tone subsets 310-d. The transmitting device may add the additional tones $O_c$ as a frequency-domain cyclic prefix or cyclic postfix or both, or a guard interval. The additional tones $O_c$ may be null (e.g., zero) tones. In some examples, for a particular precoded subset 305, the transmitting device may not apply any additional tones $O_c$ to one or more subsets 305. In some examples, adding the additional tones $O_c$ may include copying one or more tones (e.g., one or more tones of precoded subsets 305) and appending them to the subset. For instance, a transmitting device may copy one or more final tones of subset 305-a, and append them as additional tones $O_c$ at the beginning of expanded precoded tone subset 310-a. Similarly, the transmitting device may copy one or more initial tones of subset 305-a, and append them as additional tones $O_c$ at the end of expanded precoded tone subset 310-a.

The additional tones $O_c$ may allow all UEs 115-b to receive the expanded precoded tone subsets 310 as cyclic convolutions in frequency (e.g., point-wise multiplication in time). UEs 115-b may thus receive signaling from the transmitting devices using a first numerology without experiencing doppler spread that renders small subcarrier spacing inefficient. That is, even when experiencing doppler spread, a UE 115-b may be able to successfully receive transmissions from transmitting devices as a result of the additional tones $O_c$. UEs 115-b (e.g., type-2 UEs) may use time-domain equalization for detection, exploiting the low-complexity of pointwise multiplication. Additional tones $O_c$ may be bidirectional or unidirectional for each subset 305. The additional tones may also include null or zero tones, or may include pilot tones (e.g., reference signals of one or more different types). The transmitting device may append the additional tones $O_c$ to the beginning of a subset 305, to the end of a subset 305, or may interleave the additional tones $O_c$ into the middle or any other location within a subset 305.

In some examples, the transmitting device may perform an offset 315. That is, the transmitting device may apply an optional offset ($v_{shift}$) to map each expanded precoded tone subsets 310 to various resource elements (REs). In some examples, the value of $v_{shift}$ may be dependent on a TTI index (e.g., a slot index, a symbol index, or the like). In some examples, the transmitting device may perform a modulo $N_{SC}^{DL}$ operation (where $N_{SC}^{DL}$ is equal to a number of downlink subcarriers for transmitting a data stream), and the operation may facilitate a wrap-around procedure. For instance, if a number of tone indices after applying the offset $v_{shift}$ is greater than $N_{SC}^{DL}$, then the transmitting device may perform a wrap-around to the lowest tone index values after using the highest tone index values.

The transmitting device may map each of the expanded precoded tone subsets 310 to REs for transmission according to a first numerology (e.g., the first numerology described with reference to FIG. 2) having a relatively small subcarrier spacing and a long symbol duration. The transmitting device may generate a time-domain data stream based on the mapped REs, and may transmit the time-domain data stream to one or more receiving devices (e.g., UEs 115-a and UEs 115-b). For example, a number of downlink subcarriers $N_{SC}^{DL}$ may be equal to $KN_c + \Sigma O_{c_i}$. The transmitting device may perform inverse fast Fourier transform (IFFT) 320. For example, the transmitting device may perform an $N_{FFT}$-point IFFT where $N_{FFT} = N_{SC}^{DL} + N_{Guard}$ (where $N_{Guard}$ is equal to a number of guard subcarriers). The transmitting device may then place the components of the time-domain data stream in order via a parallel-to-serial converter and forward the time-domain data stream through one or more transmit chains.

In some examples, the transmitting device may also perform sample appending 325. Sample appending may include applying an additional time-domain cyclic prefix to the time-domain data stream. In some examples, the transmitting device may perform time-domain sample appending by adding a time-domain cyclic prefix, one or more pilot samples, one or more blank (e.g., zero) samples, or any combination thereof. In some examples, the transmitting device may refrain from performing sample appending 325.

In some examples, the transmitting device may receive, as an input to the data transmission scheme described herein, one or more data streams (e.g., a first layer data stream and a second layer data stream). For example, a base layer data stream may be receivable by weak UEs 115 (e.g., UEs 115 that experience a low signal-to-noise ratio (SNR) due to weaker channel conditions). An enhancement layer data stream may improve reception quality for UEs 115 that experience high SNR due to stronger channel conditions). In such examples, the transmitting device may generate multiple data streams $d_i$ (e.g., a number of data streams $i \in \{1, 2, \ldots, L\}$) and may superimpose the multiple data streams $d_i$ to generate a superimposed stream x (e.g., where $x = \Sigma \alpha_i d_i$). In some examples, for the base layer data stream and the enhancement layer data stream (e.g., where L=2), the transmitting device may superimpose the base layer data stream and the enhancement layer data stream. In such examples, the multiple layers of the data stream may be different for each subset 305. Such superposition may be referred to as multiuser superposition transmission (MUST). Thus, every modulated data symbol d(n) may include one or more components from multiple data streams, such that $d(n) = \alpha d_1(n) + (1-\alpha) d_2(n)$. Superposition of the multiple layers may occur at the modulated data symbol level. Superposition of a base layer and an enhancement layer may result in encoding a common message plus an incremental message (e.g., as opposed to encoding a more general first message plus a second message).

A transmitting device may indicate one or more transmission parameters for a given transmission. In some examples, the transmission parameters may be different for different subsets 305. For example, a MUST configuration (e.g., ratios $\alpha_i$ for different streams) may be different for subsets 305-a and 305-b. In some examples, a MUST configuration for a discrete Fourier transform precoded subset 305 may be different from a MUST configuration for an identity-precoded subset 305. In such examples, a transmitting device may signal one or more MUST configuration parameters to one or more receiving devices, indicating the MUST configuration for one or more subsets 305, as described in greater detail with reference to FIG. 5.

Figure 4:
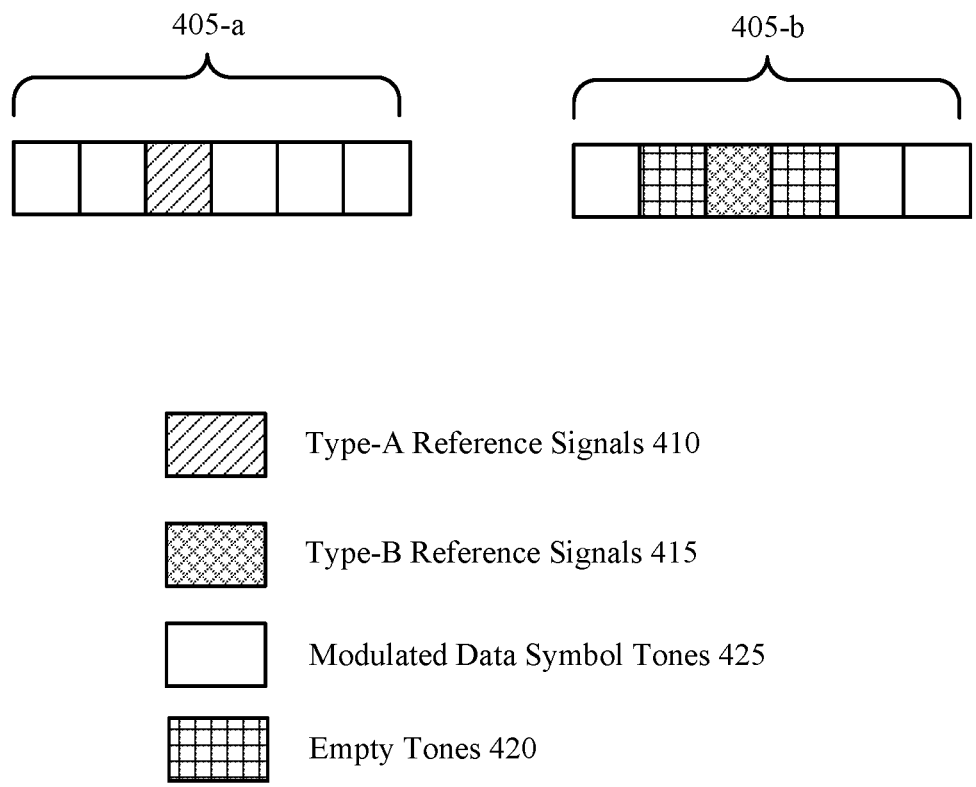
FIG. 4 illustrates an example of a transmission scheme that supports transmission techniques over delay-doppler channels in accordance with aspects of the present disclosure.

FIG. 4 illustrates an example of a transmission scheme 400 that supports transmission techniques (e.g., for terrestrial broadcast) over delay-doppler channels in accordance with aspects of the present disclosure. In some examples, transmission scheme 400 may implement aspects of wireless communication system 100. Transmission scheme 400 may be implemented by one or more base stations 105 and one or more UEs 115, which may be examples of corresponding devices as described with reference to FIGS. 1 and 2.

In some examples, subsets of modulated symbol tones 405 may include one or more pilot tones. Pilot tones may include type-A reference signals 410, type-B reference signals 415, or both.

A type-A reference signal 410 may include pilot tones for an OFDM system. In some examples, type-A reference signals 410 may be interleaved with modulated data symbol tones 425 within a subset 405-a of modulated data symbols. For instance, subset 405-a may include a total number $N_c$ of tones, including one or more modulated data symbol tones 425, and a type-A reference signal 410 interleaved with a remainder of the modulated data symbol tones 425.

A type-B reference signal 415 may be characterized by a gap adjacent to the pilot tone. The gap may be single-sided (e.g., one empty tone 420 immediately prior to or immediately subsequent to the pilot tone), or two-sided (e.g., an empty tone 420 immediately prior to the pilot tone and an empty tone 420 immediately subsequent to the pilot tone). For instance, subset 405-b may include a total number $N_c$ of tones, including one or more modulated data symbol tones 425, an empty tone 420 immediately prior to the type-B reference signal 415, and an empty tone 420 immediately subsequent to the type-B reference signal 415. In some examples, a transmitting device may utilize a type-B reference signal 415 to communicate with UEs 115 (e.g., UEs 115-b that experience high doppler-spread and low delay-spread, as described in FIG. 2) to perform channel estimation.

Type-A reference signals 410, type-B reference signals 415, or both may be present in any subset 405. In some examples, a transmitting device may include or exclude a particular type of reference signal based on which precoder is applied to each subset 405. For instance, a transmitting device may include a type-A reference signal 410 in subset 405 to which a first coding scheme (e.g., discrete Fourier transform precoding) is to be applied. The transmitting device may include type-A reference signals 410 and type-B reference signals 415 in a subset 405 to which a second coding scheme (e.g., identity-precoding) is to be applied.

In some examples, the presence of a type of reference signal in a subset 405 may be dependent on a coding scheme for that subset 405. For instance, in a subset 405 to which identity matrix multiplication is applied, a transmitting device may include more type-B reference signals 415 than type-A reference signals 410. In a subset 405 to which discrete Fourier transform precoding is to be applied, the transmitting device may include more type-A reference signals 410 than type-B reference signals 415.

Figure 5:
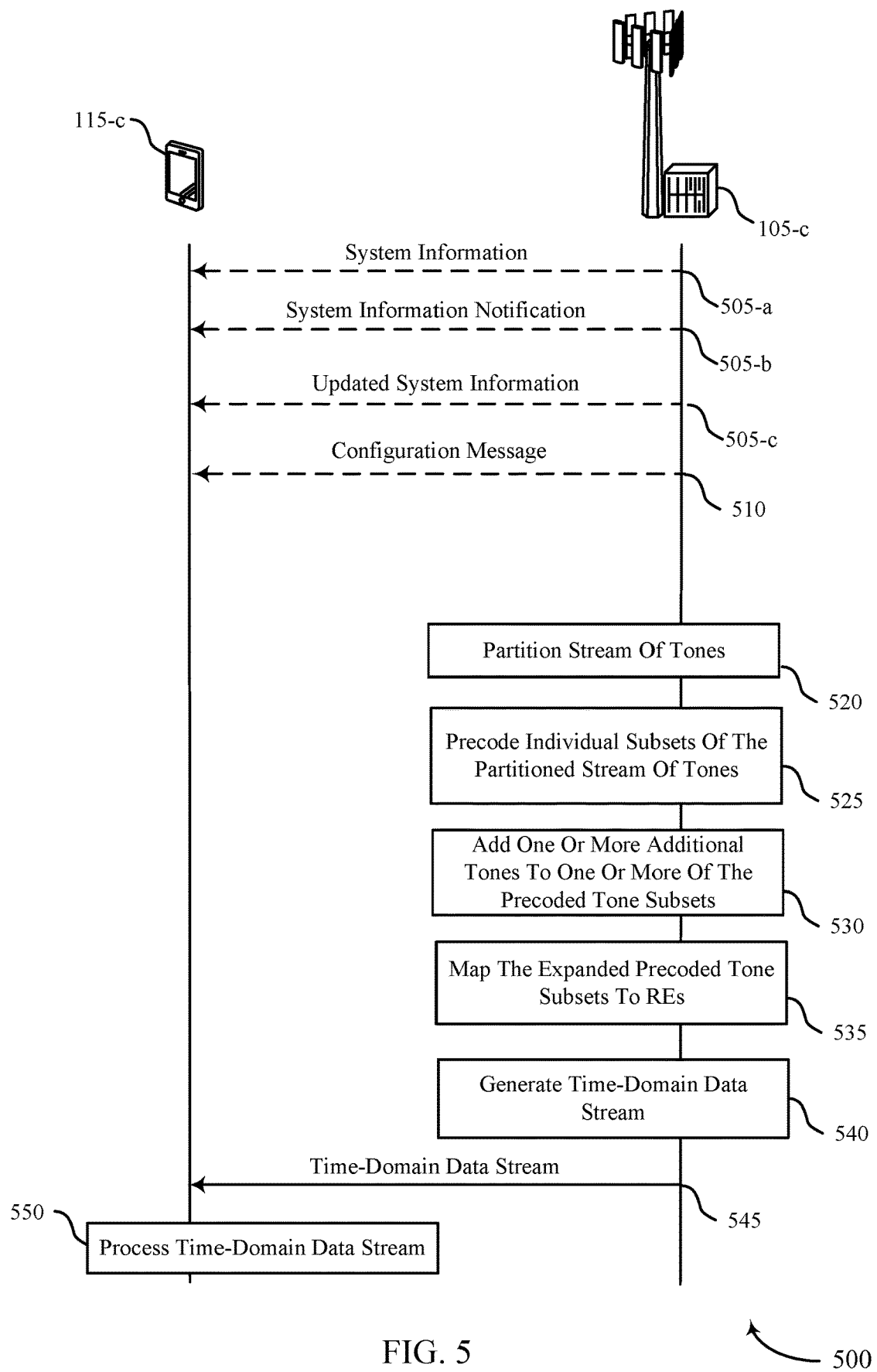
FIGS. 5 and 6 illustrate examples of process flows that support transmission techniques over delay-doppler channels in accordance with aspects of the present disclosure.

FIG. 5 illustrates an example of a process flow 500 that supports transmission techniques over delay-doppler channels in accordance with aspects of the present disclosure. In some examples, process flow 500 may implement aspects of wireless communication system 100. Process flow 500 may be implemented by a base station 105-c and a UE 115-c, which may be examples of base stations 105 and UEs 115 as described with reference to FIGS. 1 and 2. In the following description of process flow 500, operations between base station 105-c and UE 115-c as shown may be performed in a different order or at a different time. Some operations may also be omitted from process flow 500, and other operations may be added to process flow 500.

Base station 105-c may be an example of a base station 105-a or a base station 105-b as described with reference to FIG. 2. UE 115-c may be a UE 115-a or a UE 115-b as described with reference to FIG. 2. At 505 and 510, base station 105-c may unambiguously signal one or more parameters indicative of the transmission structures described herein to allow a UE 115-c to successfully receive signals from base station 105-c.

At 505 (e.g., at 505-a), base station 105-c may transmit system information to the UE 115-c. For example, base station 105-c may transmit system information including a transmission scheme for downlink broadcast communications. The system information may include an indication that the base station 105-c is using a broadcast transmission scheme that includes precoding individual subsets of one or more contiguous subsets of modulated data symbol tones. In such examples, base station 105-c may subsequently transmit a data stream at 545 using the indicated broadcast transmission scheme. The system information may also include one or more transmission parameters for the broadcast transmission scheme. For example, the transmission parameters may include an indication of a number of contiguous subsets of modulated data symbol tones (K) to be partitioned at 520, an indication of a number of modulated data symbol tones ($N_c$) in each subset, an indication of one or more additional tones ($O_c$) added to the modulated data symbol tones at 530, an indication of precoding ($P_i$) to be used on individual subsets at 525, one or more reference signal locations (e.g., type-A reference signals, type-B reference signals, or both) within one or more of the modulated data symbol tones, an indication of one or more transmission configurations (e.g., MUST configurations as described with reference to FIG. 3), or any combination thereof. Base station 105-c may indicate the broadcast transmission parameters (e.g., at 505-a, or 505-c) via a bitmap, or using one or more indices associated with pre-defined combination of the one or more broadcast transmission parameters. For instance, the broadcast transmission parameters in various combinations may be included in a standardized lookup table, each entry in the lookup table corresponding to an index value. The system information may include one or more indices of the lookup table, indicating a combination of broadcast transmission parameters.

In some examples, base station 105-c may identify that the updated broadcast transmission parameters are to be transmitted (e.g., at 505-c). In such examples, at 505-b, base station 105-c may transmit a notification that the system information is to be updated (e.g., reacquired) by UE 115-c. UE 115-c may receive the system information notification at 505-b. In some examples, UE 115-c may transmit a system information request. The system information request may include a request to acquire the updated system information. In other examples, UE 115-c may not transmit any ACK message or system information request, or the like. At 505-c, base station 105-c may transmit updated system information which includes updated broadcast transmission parameters. In such examples, base station 105-c may generate a time-domain data stream at 540 according to the updated transmission parameters, and may transmit the time-domain data stream at 545. At 550, UE 115-c may receive, process, and decode the time-domain data stream based on the updated broadcast transmission parameters.

In some examples, a transmitting device (e.g., a base station 105-c), may transmit an indication that updated broadcast transmission parameters are to be transmitted (e.g., at 505-c). The indication may be a system information change notification (e.g., a downlink control information (DCI) message). The DCI message may indicate to a receiving device (e.g., a UE 115-c) that the receiving device should update (e.g., reacquire) new system information. Base station 105-c may transmit updated system information (e.g., including updated broadcast parameters). In some examples, the receiving device may not transmit an acknowledgment (ACK) message for the updated system information (e.g., in a broadcast scenario, or where UEs 115 are receive-only devices). In such examples, base station 105-c may transmit the updated system information without waiting for an ACK message or a request to acquire the updated system information.

In some examples, at 510, base station 105-c may transmit a configuration message to UE 115-c. For instance, to transmit a downlink unicast message to UE 115-c, base station 105-c may transmit a configuration message (e.g., an RRC unicast message) exclusively to UE 115-c. The configuration message may indicate one or more transmission parameters associated with a set of one or more TTIs. The configuration message may explicitly indicate a number of TTIs for which the indicated transmission parameters apply. The configuration message may indicate transmission parameters to be used until otherwise signaled. For instance, the configuration message may be an RRC message, which semi-statically configures the UE 115-c to use a set of one or more transmission parameters for a predefined period or until a subsequent RRC signal indicates new or updated transmission parameters. In some examples, base station 105-c may transmit one or more configuration messages via RRC signaling and DCI signaling. For example, base station 105-c may configure UE 115-c with the one or more transmission parameters via RRC signaling, and may activate the transmission parameters for a pending downlink transmission via a DCI message.

The one or more transmission parameters transmitted at 510 may include a precoding scheme for one or more tone subsets for precoding at 525, a number of superimposed data streams for each precoded tone subset of the one or more precoded tone subsets (e.g., a MUST configuration, or the like. In some examples, the transmission parameters may be different for different tone subsets.

In some examples, the transmission parameters may vary over the set of one or more TTIs. For example, base station 105-c may vary the precoding matrices (e.g., $P_1$, $P_2$, $P_3$ . . . $P_{K-1}$). That is, the precoding matrices may change across slots, symbols, or the like. Thus, a subset of modulated data symbol tones may be precoded according to one precoding scheme in a first slot, and precoded according to another precoding scheme in a second slot. For instance, in a first slot, all precoders may be discrete Fourier Transform matrices, and in a second slot, all precoders may be identity matrices. In some examples, patterns may alternate in time. The transmission parameters may indicate such alternating patterns. In some examples, MUST configurations may also change across time. The transmission parameters may indicate MUST configurations for various TTIs. For instance, the transmission parameters may specifically indicate MUST configurations for each TTI of a set of one or more TTIs, or may indicate a pattern of MUST values across TTIs, or the like. In some examples, the transmission parameters may include MUST configuration information, which may be different for different precoded tone subsets. For instance, a first MUST configuration may correspond to discrete Fourier Transform precoding (e.g., $d(n)=\alpha_1 d_1(n)+(1-\alpha_1)d_1(n)$), and a second MUST configuration may correspond to identity matrix multiplication precoding (e.g., $\alpha_2 d_1(n)+(1-\alpha_2)d_1(n)$). In such examples, each data stream may have a different power level. Such different power levels may vary across TTIs. In some examples, power values may be different across subsets. For instance, discrete Fourier transform precoding may be preferential for a first stream, resulting in more power for the first stream and less power for the second stream. In some examples, identity-precoded subsets may be preferential for a different scheme.

Having provided one or more transmission parameters (e.g., at 505, or at 510, or a combination thereof), base station 105-c may configure and transmit a data stream to UE 115-c.

At 520, base station 105-c may partition a stream of tones. The stream of tones may include modulated data symbols. In some examples, the stream of tones may include a first portion of the modulated data symbols including a base layer data stream and a second portion of the modulated data symbol including an enhancement layer data stream. In such examples, at 540, base station 105-c may generate a time-domain data stream including both the base layer data stream and the enhancement layer data stream. At 545, base station 105-c may transmit the base layer data stream superimposed with the enhancement layer data stream. Base station 105-c may partition the stream of tones into one or more contiguous subsets of modulated data symbol tones. The number of modulated data symbol tones in each subset may be equal to a power of two. The first subset or the last subset may have a different number of modulated data symbol tones from a remainder of the subsets of modulated data tones.

In some cases, the one or more contiguous subsets of modulated data symbol tones may include one or more of a first type of reference signal tones (e.g., type-A reference signals), one or more of a second type of reference signal tones (e.g., type-B reference signals), or both. In such cases, precoding individual subsets of modulated data symbol tones may be based on the presence of the first type of reference signal tones, the presence of the second type of reference signal tones, or both, in the individual subsets. That is, base station 105-c may precode (e.g., at 525) the subsets of modulated data symbol tones according to a first precoding scheme if the subset includes type-A reference signals, and may precode the subsets of modulated data symbol tones according to a second precoding scheme if the subset includes type-A reference signals, type-B reference signals, or both. Type-A reference signals may be interleaved with other modulated data symbol tones, and type-B reference signals may be adjacent to at least one gap (e.g., empty) tone within a subset of modulated data symbol tones.

At 525, base station 105-c may precode the individual subsets of the one or more contiguous subsets of modulated data symbol tones so as to generate one or more precoded tone subsets. In some examples, base station 105-c may precode the individual subsets using a first coding scheme (e.g., a discrete Fourier transform spreading operation), a second coding scheme (e.g., an identity matrix multiplication operation), or both.

At 530, base station 105-c may add one or more additional tones to the one or more precoded tone subsets so as to generate one or more expanded precoded tone subsets. In some examples, base station 105-c may generate a frequency-domain cyclic prefix or a frequency-domain cyclic postfix including the one or more additional tones for each expanded precoded tone subset. The one or more additional tones may be null tones, unidirectional tones, bidirectional tones, or a combination thereof (e.g., for each subset of modulated data tones). In some examples, the one or more additional tones may include one or more pilot tones. In some examples, one or more of the modulated data symbol tones may include the one or more pilot tones.

At 535, base station 105-c may map the one or more expanded precoded tone subsets to REs. In some examples, base station 105-c may map the expanded precoded tone subsets to REs according to a first numerology associated with a first set of one or more UEs 115. Each expanded precoded tone subset may be a frequency-flat channel for a second set of one or more UEs 115 associated with a second numerology. In such examples, the first numerology may include a smaller subcarrier spacing and a larger cyclic prefix than the second numerology. In some cases, base station 105-c may apply an offset value, which is based on a symbol or slot index, to the expanded precoded tone subsets.

At 540, base station 105-c may generate a time-domain data stream based on the REs. Where the stream of tones received at 515 includes multiple data streams, the generated time-domain data stream may include the multiple data streams. In some examples, base station 105-c may append a cyclic prefix, a pilot sample, a blank sample, or a combination thereof, to the mapped REs, or may refrain from sample appending.

At 545, base station 105-c may transmit the time-domain data stream to UE 115-c.

At 550, having received one or more transmission parameters (e.g., at 505, or at 510, or both), UE 115-c may receive and process the time-domain data stream transmitted at 545. For instance, UE 115-c may receive the time-domain data stream from base station 105-c, and then may convert the time-domain data stream into a frequency-domain representation of the REs mapped at 535. UE 115-c may decode the REs into contiguous subsets of modulated data symbol tones, and may identify data received via one or more of the one or more contiguous subsets of modulated data symbol tones. As a result of the transmission scheme described herein, UE 115-c may be able to successfully receive and decode the time-domain data stream whether UE 115-c is a UE 115-a or a UE 115-b (as described in greater detail with reference to FIG. 2).

In some examples, a UE 115 (e.g., UE 115-c) may utilize techniques described herein with respect to FIG. 3 to send a transmission to a base station 105 (e.g., base station 105-c). In such examples, the UE 115 may receive control information from the base station. The control information may include transmission parameters (e.g., one or more of the transmission parameters described with reference to the transmission parameters in the system information at 505-a). In some examples, the UE 115 may receive a configuration message from the base station 105. The configuration message may include one or more transmission parameters (e.g., one or more of the transmission parameters described with reference to the parameters in the configuration message at 510). The UE 115 may perform steps described with reference to FIG. 3, and may precode an uplink transmission according to the transmission parameters indicated by the base station 105.

Figure 6:
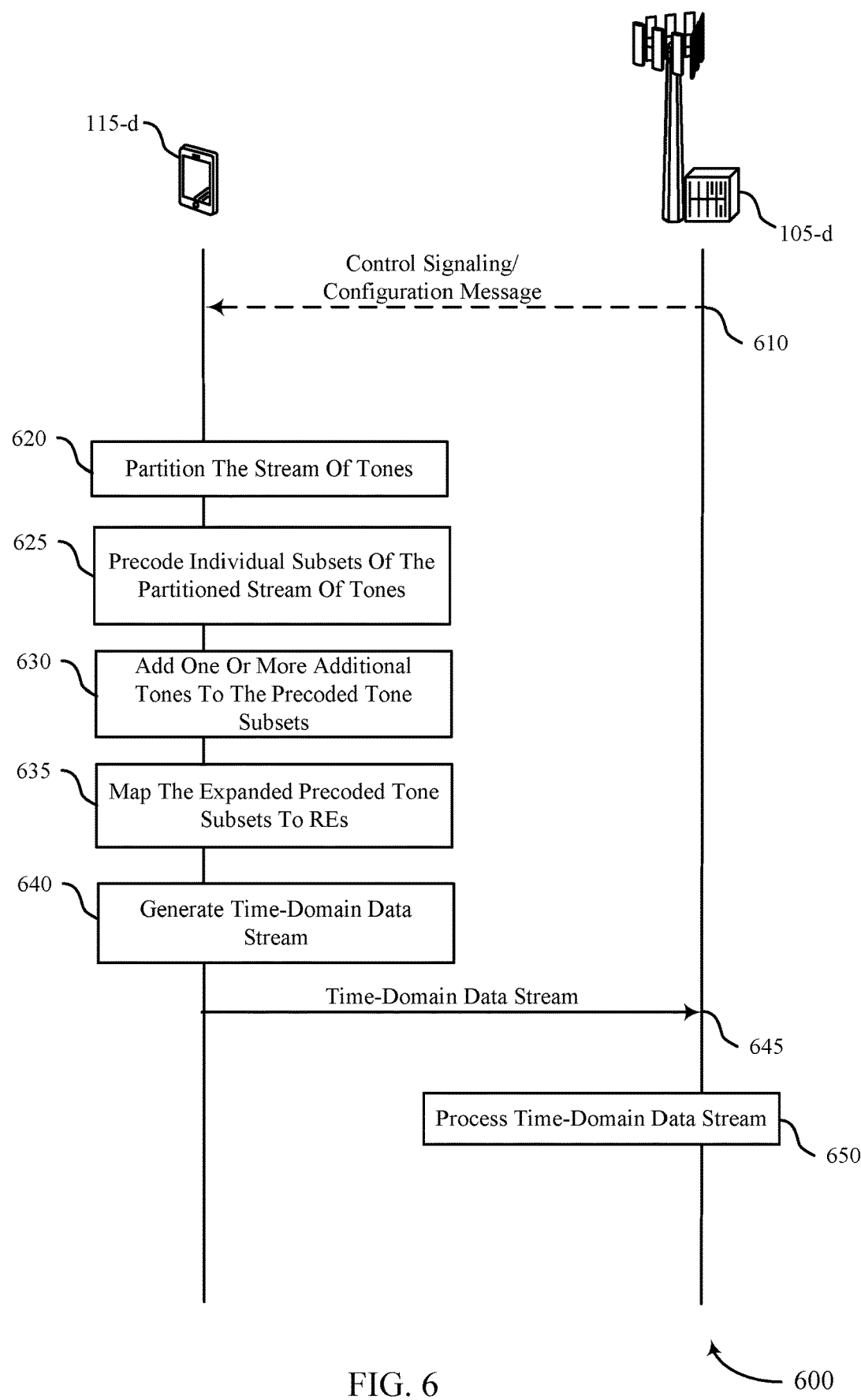

FIG. 6 illustrates an example of a process flow 600 that supports transmission techniques over delay-doppler channels in accordance with aspects of the present disclosure. In some examples, process flow 600 may implement aspects of wireless communication system 100. Process flow 600 may be implemented by a base station 105-d and a UE 115-d, which may be examples of base stations 105 and UEs 115 as described with reference to FIGS. 1 and 2. UE 115-d may be an example of a transmitting device described with reference to FIG. 3, and base station 105-d may be an example of the receiving device described with reference to FIG. 3. In the following description of process flow 600, operations between base station 105-d and UE 115-d as shown may be performed in a different order or at a different time. Some operations may also be omitted from process flow 600, and other operations may be added to process flow 600.

Base station 105-d may be an example of a base station 105-a or a base station 105-b as described with reference to FIG. 2. UE 115-d may be a UE 115-a or a UE 115-b as described with reference to FIG. 2. At 605 and 610, base station 105-d may unambiguously signal one or more parameters indicative of the transmission structured described herein to allow UE 115-d to successfully transmit signals to base station 105-d.

In some examples, at 610, base station 105-d may transmit control signaling or a configuration message to UE 115-d. For instance, the configuration message may be a control message indicating an uplink transmission scheme for sending uplink (e.g., unicast) messages to base station 105-d. The configuration message may indicate one or more transmission parameters associated with a set of one or more TTIs. The configuration message may explicitly indicate a number of TTIs for which the indicated transmission parameters apply. The configuration message may indicate transmission parameters to be used until otherwise signaled. The configuration message may be an RRC message. In some examples, base station 105-d may transmit communicate one or more configuration message via RRC signaling and DCI signaling. For example, base station 105-d may configure UE 115-d with the one or more transmission parameters via RRC signaling, and may activate the transmission parameters for a pending downlink transmission via a DCI message.

The one or more transmission parameters transmitted at 610 may include a precoding scheme for one or more tone subsets for precoding at 625, a number of superimposed data streams for each precoded tone subset of the one or more precoded tone subsets (e.g., a MUST configuration, or the like). In some examples, the transmission parameters may be different for different tone subsets. UE 115-d may utilize the transmission parameters as described herein, to prepare a data stream for an uplink transmission to base station 105-d at 645.

In some examples, the transmission parameters may vary over the set of one or more TTIs. For example, UE 115-d may vary the precoding matrices (e.g., $P_1, P_2, P_3 \ldots P_{K-1}$) such that they change across slots, symbols, or the like. Thus, a subset of modulated data symbol tones may be precoded according to one precoding scheme in a first slot, and precoded according to another precoding scheme in a second slot. For instance, in a first slot, all precoders may be discrete Fourier Transform matrices, and in a second slot, all precoders may be identity matrices. In some examples, patterns may alternate in time. The transmission parameters may indicate such alternating patterns. In some examples, MUST configurations may also change across time. The transmission parameters may indicate MUST configurations for various TTIs. For instance, the transmission parameters may specifically indicate MUST configurations for each TTI of a set of one or more TTIs, or may indicate a pattern of MUST values across TTIs, or the like. In some examples, the transmission parameters may include MUST configuration information, which may be different for different precoded tone subsets. For instance, a first MUST configuration may correspond to discrete Fourier Transform precoding (e.g., $d(n)=\alpha_1 d_1(n)+(1-\alpha_1)d_1(n)$), and a second MUST configuration may correspond to identity matrix multiplication precoding (e.g., $\alpha_2 d_1(n)+(1-\alpha_2)d_1(n)$). In such examples, each data stream may have a different power level. Such different power levels may vary across TTIs. In some examples, power values may be different across subsets. For instance, discrete Fourier transform precoding may be preferential for a first stream, resulting in more power for the first stream and less power for the second stream. In some examples, identity-precoded subsets may be preferential for a different scheme. UE 115-*d* may configure a data stream for transmission at 645 based on the indicated transmission parameters.

Having received the one or more transmission parameters (e.g., at 610), UE 115-*d* may configure and transmit a data stream to base station 105-*d*.

At 620, UE 115-*d* may partition a stream of tones. The stream of tones may include modulated data symbols. In some examples, the stream of tones may include a first portion of the modulated data symbols including a base layer data stream and a second portion of the modulated data symbol including an enhancement layer data stream. In such examples, at 640, UE 115-*d* may generate a time-domain data stream including both the base layer data stream and the enhancement layer data stream. At 645 UE 115-*d* may transmit the base layer data stream superimposed with the enhancement layer data stream. UE 115-*d* may partition the stream of tones into one or more contiguous subsets of modulated data symbol tones. The number of modulated data symbol tones in each subset may be equal to a power of two. The first subset or the last subset may have a different number of modulated data symbol tones from a remainder of the subsets of modulated data tones.

In some cases, one or more of the contiguous subsets of modulated data symbol tones may include one or more of a first type of reference signal tones (e.g., type-A reference signals), one or more of a second type of reference signal tones (e.g., type-B reference signals), or both. In such cases, precoding the individual subsets of modulated data symbol tones may be based on the presence of the first type of reference signal tones, the presence of the second type of reference signal tones, or both, in the individual subsets. That is, UE 115-*d* may precode (e.g., at 625) the subsets of modulated data symbol tones according to a first precoding scheme if the subset includes type-A reference signals, and may precode the subsets of modulated data symbol tones according to the first a second precoding scheme if the subset includes type-A reference signals, type-B reference signals, or both. Type-A reference signals may be interleaved with other modulated data symbol tones, and type-B reference signals may be adjacent to at least one gap (e.g., empty) tone within a subset of modulated data symbol tones.

At 625, UE 115-*d* may precode individual subsets of the one or more contiguous subsets of modulated data symbol tones so as to generate one or more precoded tone subsets. In some examples, UE 115-*d* may precode the individual subsets using a first coding scheme (e.g., a discrete Fourier transform spreading operation), a second coding scheme (e.g., an identity matrix multiplication operation), or both.

At 630, UE 115-*d* may add one or more additional tones to the one or more precoded tone subsets so as to generate one or more expanded precoded tone subsets. In some examples, UE 115-*d* may generate a frequency-domain cyclic prefix or a frequency-domain cyclic postfix including the one or more additional tones for each expanded precoded tone subset. The one or more additional tones may be null tones, unidirectional tones, bidirectional tones, or a combination thereof (e.g., for each subset of modulated data tones). In some examples, the one or more additional tones may include one or more pilot tones. In some examples, one or more of the modulated data symbol tones may include the one or more pilot tones.

At 635, UE 115-*d* may map the one or more expanded precoded tone subsets to REs. In some examples, UE 115-*d* may map the expanded precoded tone subsets to REs according to a first numerology associated with a first set of one or more UEs 115. Each expanded precoded tone subset may be a frequency-flat channel for a second set of one or more UEs 115 associated with a second numerology. In such examples, the first numerology may include a smaller subcarrier spacing and a larger cyclic prefix than the second numerology. In some cases, UE 115-*d* may apply an offset value, which is based on a symbol or slot index, to the expanded precoded tone subsets.

At 640, UE 115-*d* may generate a time-domain data stream based on the REs. Where the stream of tones received at 615 included multiple data streams, the generated time-domain data stream may include the multiple data streams. In some examples, UE 115-*d* may append a cyclic prefix, a pilot sample, a blank sample, or a combination thereof, to the mapped REs, or may refrain from sample appending.

At 645, UE 115-*d* may transmit the time-domain data stream to base station 105-*d*.

At 650, having transmitted one or more transmission parameters at 610, base station 105-*d* may receive and process the time-domain data stream transmitted at 645. For instance, base station 105-*d* may receive the time-domain data stream from UE 115-*d*, and then may convert the time-domain data stream into a frequency-domain representation of the REs mapped at 635. Base station 105-*d* may decode the REs into contiguous subsets of modulated data symbol tones, and may identify data received via one or more of the one or more contiguous subsets of modulated data symbol tones. As a result of the transmission scheme described herein, base station 105-*d* may be able to successfully receive and decode the data.

Figure 7:
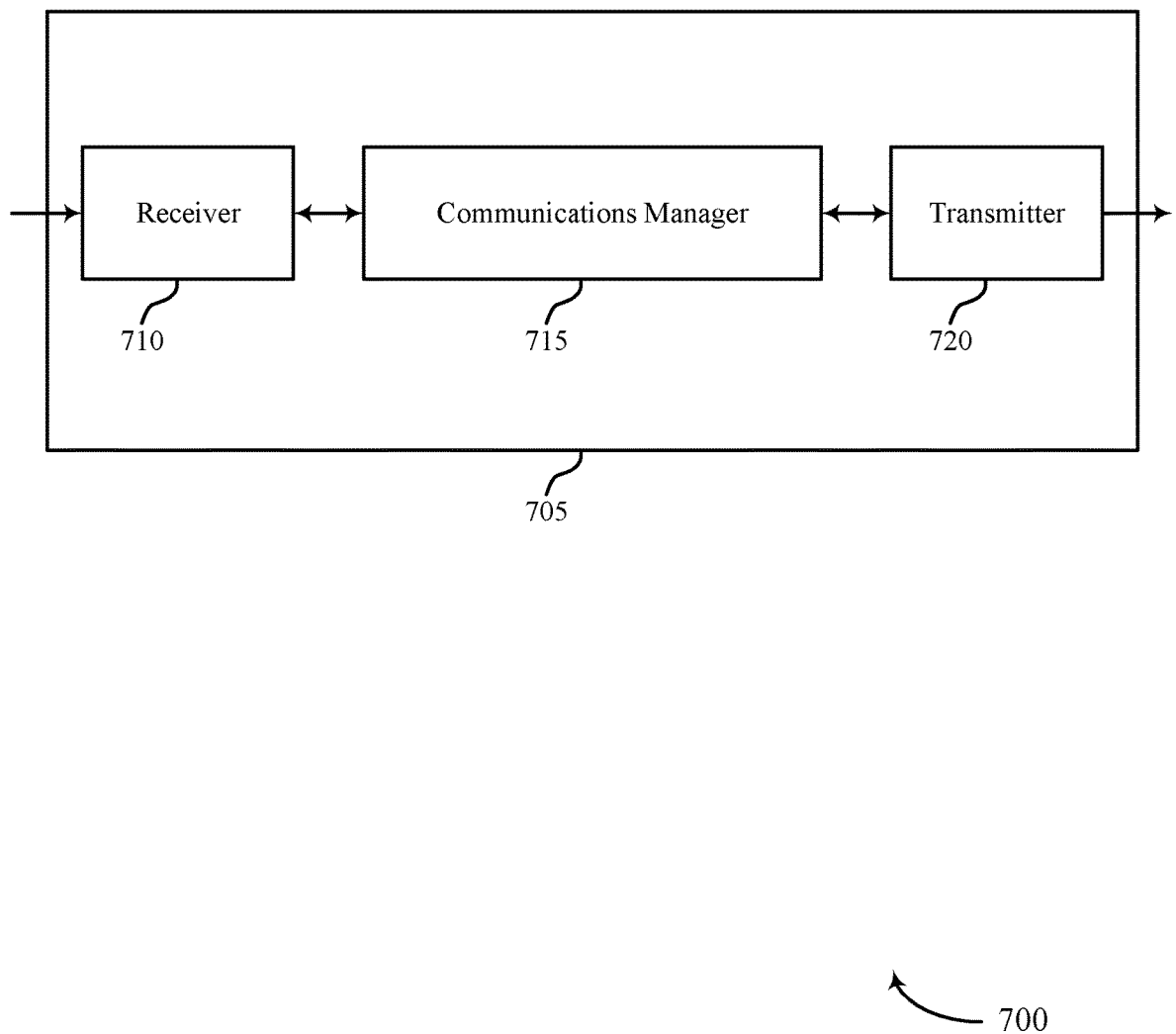
FIGS. 7 and 8 show block diagrams of devices that support transmission techniques over delay-doppler channels in accordance with aspects of the present disclosure.

FIG. 7 shows a block diagram 700 of a device 705 that supports transmission techniques over delay-doppler channels in accordance with aspects of the present disclosure. The device 705 may be an example of aspects of a UE 115 as described herein, or a base station 105 as described herein. The components described with reference to the device 700 may be utilized by a receiving device that may be either a UE 115 or a base station 105. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission techniques over delay-doppler channels, etc.). Information may be passed on to other components of the device 705. The receiver 710 may be an example of aspects of the transceiver 1020 described with reference to FIG. 10. The receiver 710 may utilize a single antenna or a set of one or more antennas.

The communications manager 715 may receive a data stream from a transmitting wireless device, convert the data stream into a frequency-domain representation of REs, identify data received via one or more of the one or more contiguous subsets of modulated data symbol tones, and decode the REs into one or more contiguous subsets of modulated data symbol tones. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of one or more antennas.

By including or configuring the communications manager 715 in accordance with examples described herein, the device 705 may support techniques for improved communication reliability, reduced latency, and enhanced spectral efficiency based on allowing wireless devices (e.g., UEs 115) associated with different numerologies (as described herein with reference to FIG. 2) to mitigate doppler spread using modified subsets of modulated data symbol tones.

Figure 8:
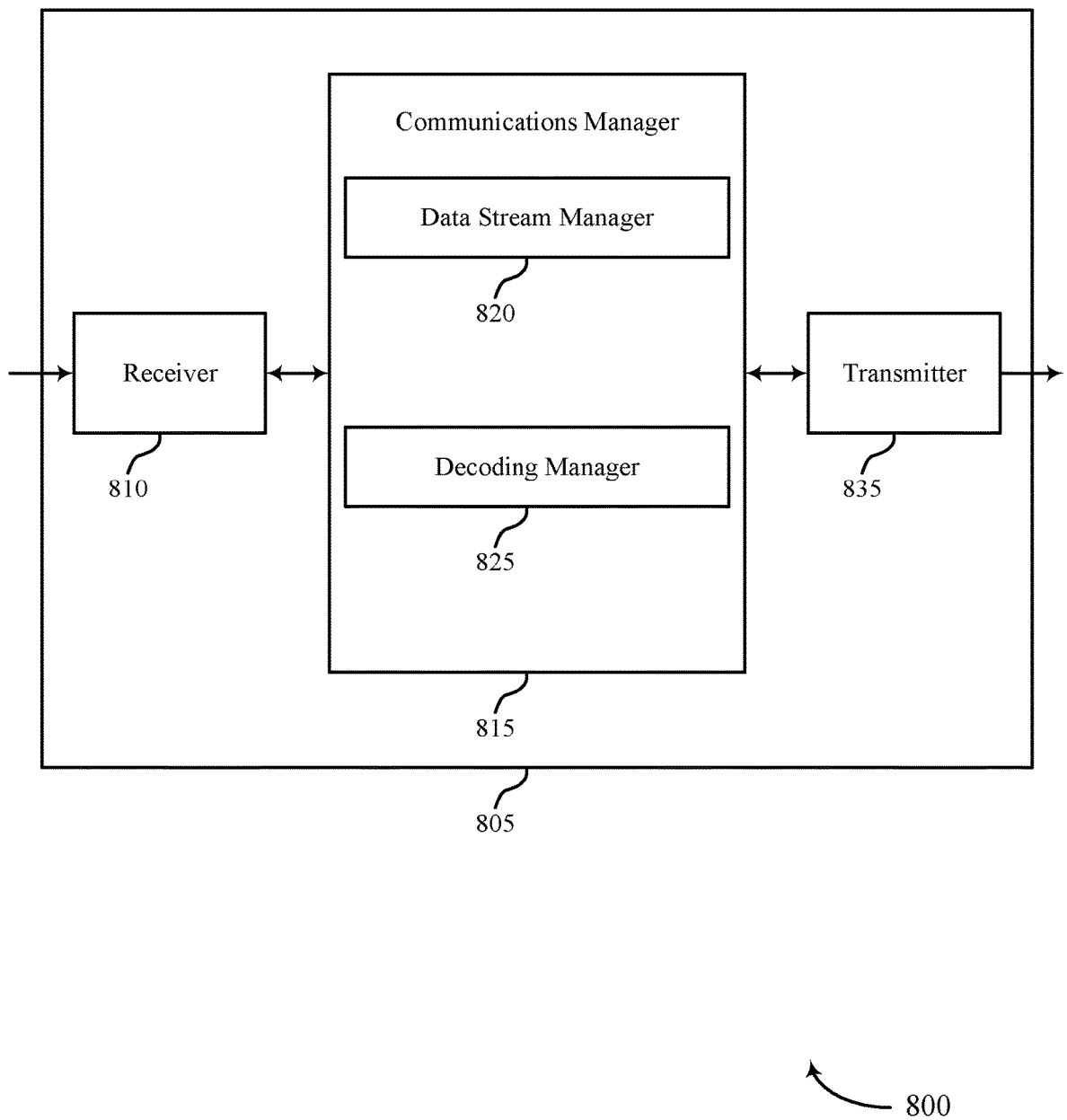

FIG. 8 shows a block diagram 800 of a device 805 that supports transmission techniques over delay-doppler channels in accordance with aspects of the present disclosure. The device 805 may be an example of aspects of a device 705, or a UE 115, or a base station 105 as described herein. The device 805 may include a receiver 810, a communications manager 815, and a transmitter 830. The device 805 may also include a processor. Each of these components may be in communication with one another (e.g., via one or more buses). The components described with reference to the device 805 may be utilized by a receiving device that may be either a UE 115 or a base station 105.

The receiver 810 may receive information such as packets, user data, or control information associated with various information channels (e.g., control channels, data channels, and information related to transmission techniques over delay-doppler channels, etc.). Information may be passed on to other components of the device 805. The receiver 810 may be an example of aspects of the transceiver 1020 described with reference to FIG. 10. The receiver 810 may utilize a single antenna or a set of one or more antennas.

The communications manager 815 may be an example of aspects of the communications manager 715 as described herein. The communications manager 815 may include a data stream manager 820 and a decoding manager 825. The communications manager 815 may be an example of aspects of the communications manager 1010 described herein.

The data stream manager 820 may receive a data stream from a transmitting wireless device, convert the data stream into a frequency-domain representation of REs, and identify data received via one or more of the one or more contiguous subsets of modulated data symbol tones.

The decoding manager 825 may decode the REs into one or more contiguous subsets of modulated data symbol tones.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of one or more antennas.

Figure 9:
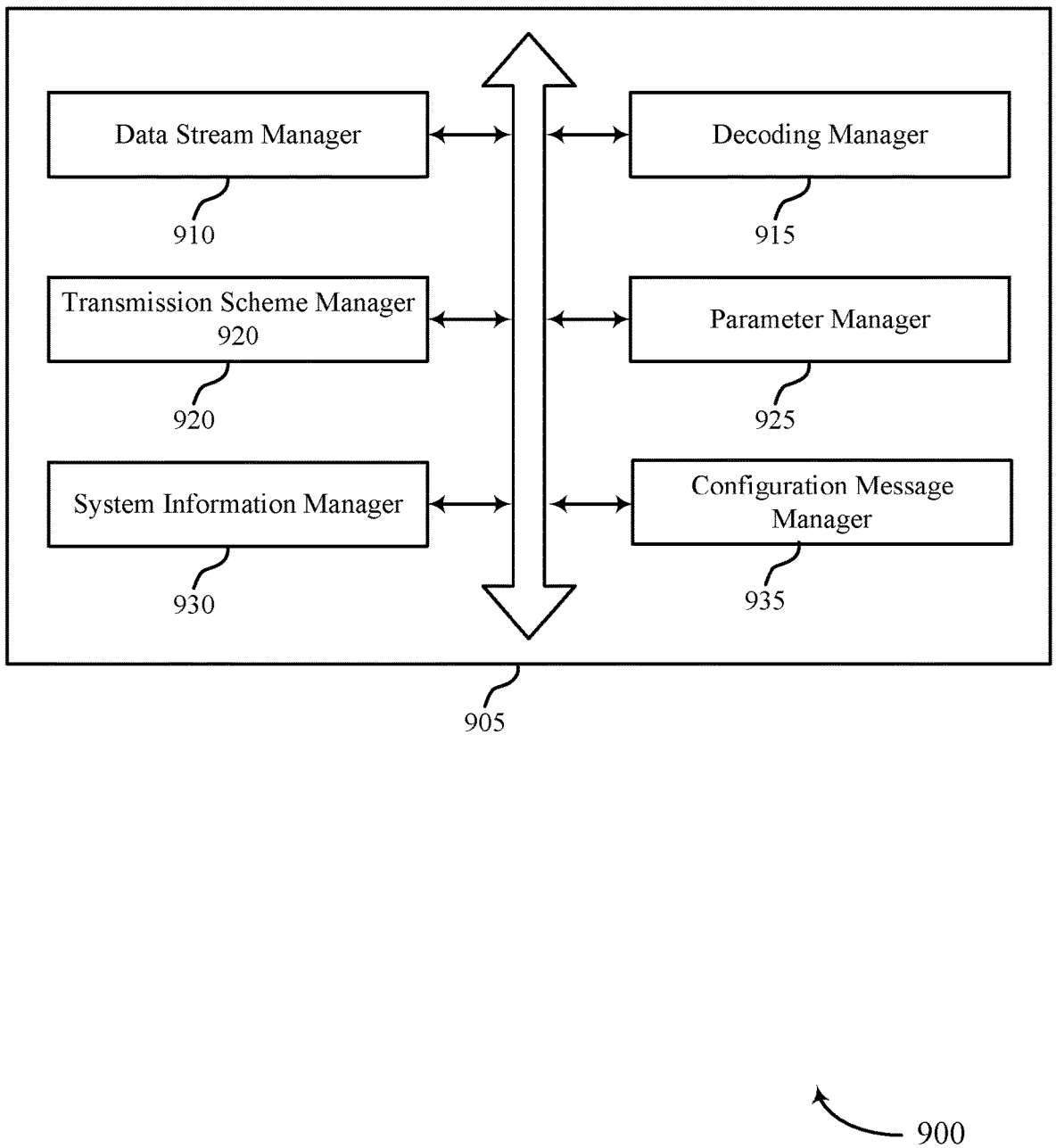
FIG. 9 shows a block diagram of a communications manager that supports transmission techniques over delay-doppler channels in accordance with aspects of the present disclosure.

FIG. 9 shows a block diagram 900 of a communications manager 905 that supports transmission techniques over delay-doppler channels in accordance with aspects of the present disclosure. The communications manager 905 may be an example of aspects of a communications manager 715, a communications manager 815, or a communications manager 1010 described herein. The communications manager 905 may include a data stream manager 910, a decoding manager 915, a transmission scheme manager 920, a parameter manager 925, a system information manager 930, and a configuration message manager 935. Each of these modules may communicate, directly or indirectly, with one another (e.g., via one or more buses). The communications manager 905 may perform techniques described herein as part of a receiving device. The receiving device may be a UE 115 (e.g., as described with reference to FIG. 5), or base station 105-d (e.g., as described with reference to FIG. 6). The components described with reference to the communications manager 905 may be utilized by a receiving device that may be either a UE 115 or a base station 105. Thus, when the receiving device is a UE 115, the receiving device may receive configuration information from a base station 105, and may subsequent receive and decode a data stream from the base station 105. Or, when the receiving device is a base station 105, the receiving device may first transmit configuration information (e.g., via control signaling) to a transmitting device (e.g., a UE 115), and may subsequently receive uplink communications from the transmitting device based on the configuration information.

The data stream manager 910 may receive a data stream from a transmitting wireless device. In some examples, the data stream manager 910 may convert the data stream into a frequency-domain representation of REs. In some examples, the data stream manager 910 may identify data received via the one or more contiguous subsets of modulated data symbol tones. In some examples, the data stream manager 910 may detect the data stream via frequency-domain equalization when the receiving wireless device is using a first numerology or via time-domain equalization when the receiving wireless device is using a second numerology, where the first numerology includes a smaller subcarrier spacing and a larger cyclic prefix than the second numerology.

The decoding manager 915 may decode the REs into one or more contiguous subsets of modulated data symbol tones.

The transmission scheme manager 920 may receive, from the transmitting wireless device, system information or control signaling including an indication that the transmitting wireless device is to use a transmission scheme that includes precoding individual subsets of the one or more contiguous subsets of modulated data symbol tones.

In some cases, the transmission scheme includes a broadcast transmission scheme, where transmitting the data signal includes transmitting a broadcast signal to a set of one or more receiving devices. In some cases, the transmission scheme includes a unicast transmission scheme, where transmitting the data signal includes transmitting a unicast signal to a receiving device.

In some examples (e.g., when the receiving device is a UE 115), the parameter manager 925 may receive, with the system information or control signaling, one or more transmission parameters for the transmission scheme. In some examples (e.g., where the receiving device is a base station), the parameter manager 925 may be an example of a transmission parameter manager 1325, as described with reference to FIG. 13. In such examples, parameter manager 925 may transmit control signaling including an indication of one or more transmission parameters for precoding the individual subsets of the one or more contiguous subsets of modulated data symbols, where decoding the REs into one or more contiguous subsets of modulated data symbol tones is based on the indication of the one or more transmission parameters, and may subsequently receive uplink data streams from a transmitting device based on the one or more transmission parameters. In some cases (e.g., when the receiving device is a UE 115 or a base station 105), the one or more transmission parameters may include an indication of at least one of a number of the one or more contiguous subsets of modulated data symbol tones, an indication of a set of one or more additional tones added to the one or more contiguous subsets of modulated data symbol tones, an indication of a signal structure or mapping associated with the one or more additional tones, an indication of precoding used on the one or more contiguous subsets of modulated data symbol tones, one or more reference signal locations, an indication of one or more transmission configurations, a configuration of superimposed data streams associated with the modulated data symbols, or a combination thereof.

In some cases, the one or more transmission parameters are indicated via a bitmap or one of a set of one or more indices associated with pre-defined combinations of the one or more transmission parameters.

The system information manager 930 may receive a notification that the system information is to be updated in order to receive an updated transmission parameter. In some examples, the system information manager 930 may receive the updated system information with the updated transmission parameter.

The configuration message manager 935 may communicate, via a configuration message, an indication of one or more transmission parameters associated with a set of one or more TTIs. In some examples, communicating the configuration message includes receiving the configuration message from a transmitting device. In some cases, the one or more transmission parameters include a coding scheme used for precoding individual subsets of the one or more contiguous subsets of modulated data symbol tones into a set of one or more precoded tone subsets. In some cases, the one or more transmission parameters include a number of superimposed data streams for each precoded tone subset of the set of one or more precoded tone subsets, and a power value for each of the superimposed data streams. In some cases, the one or more transmission parameters include different transmission parameters for different superimposed data streams. In some cases, the one or more transmission parameters vary over the set of one or more TTIs. In some cases, the configuration message includes a radio resource control message.

Figure 10:
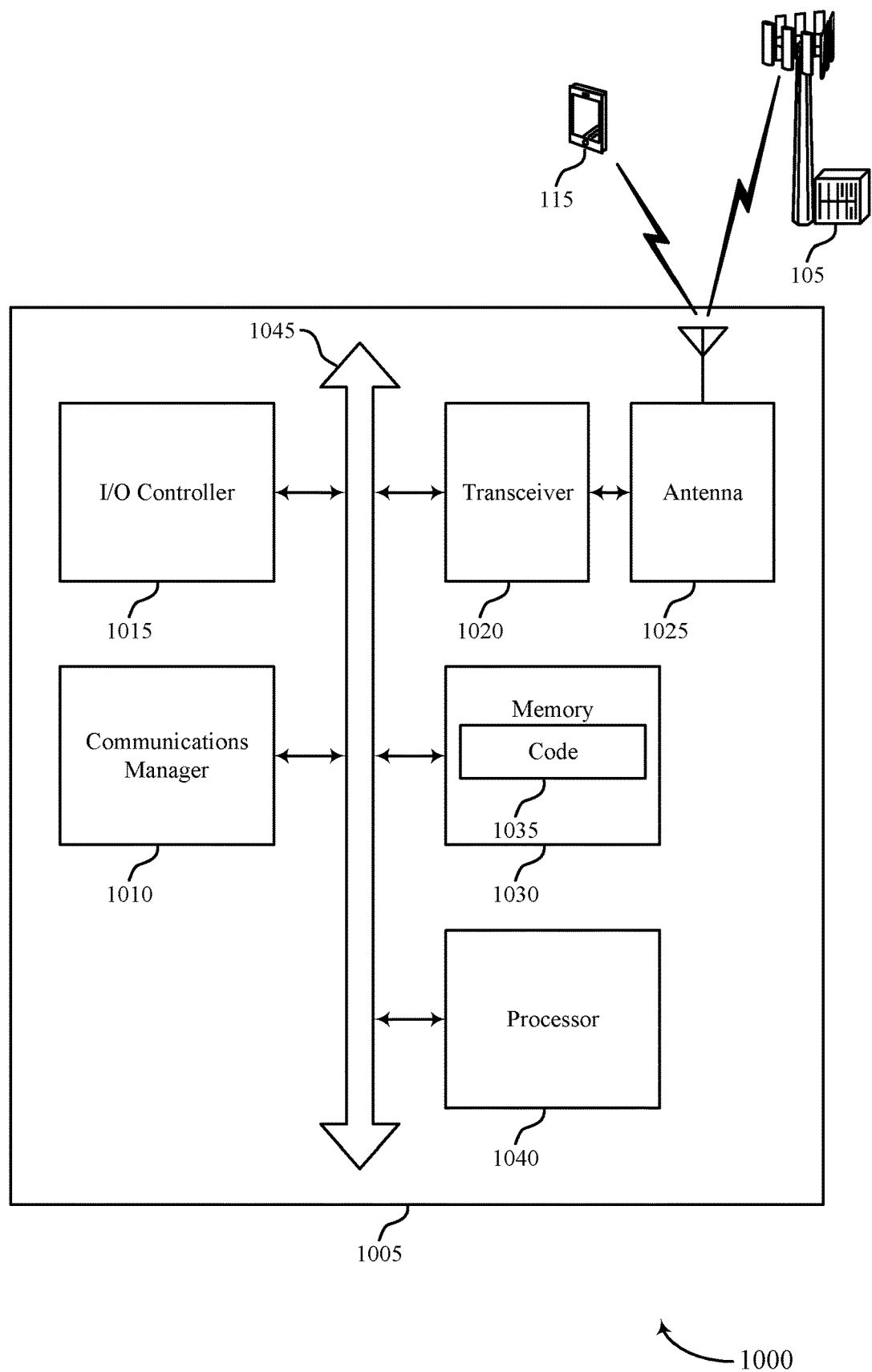
FIG. 10 shows a diagram of a system including a device that supports transmission techniques over delay-doppler channels in accordance with aspects of the present disclosure.

FIG. 10 shows a diagram of a system 1000 including a device 1005 that supports transmission techniques over delay-doppler channels in accordance with aspects of the present disclosure. The device 1005 may be an example of or include the components of device 705, device 805, or a UE 115, or a base station 105 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045). The components described with reference to the device 1005 may be utilized by a receiving device that may be either a UE 115 or a base station 105.

The communications manager 1010 may receive a data stream from a transmitting wireless device, convert the data stream into a frequency-domain representation of REs, identify data received via one or more of the one or more contiguous subsets of modulated data symbol tones, and decode the REs into one or more contiguous subsets of modulated data symbol tones.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission techniques over delay-doppler channels).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
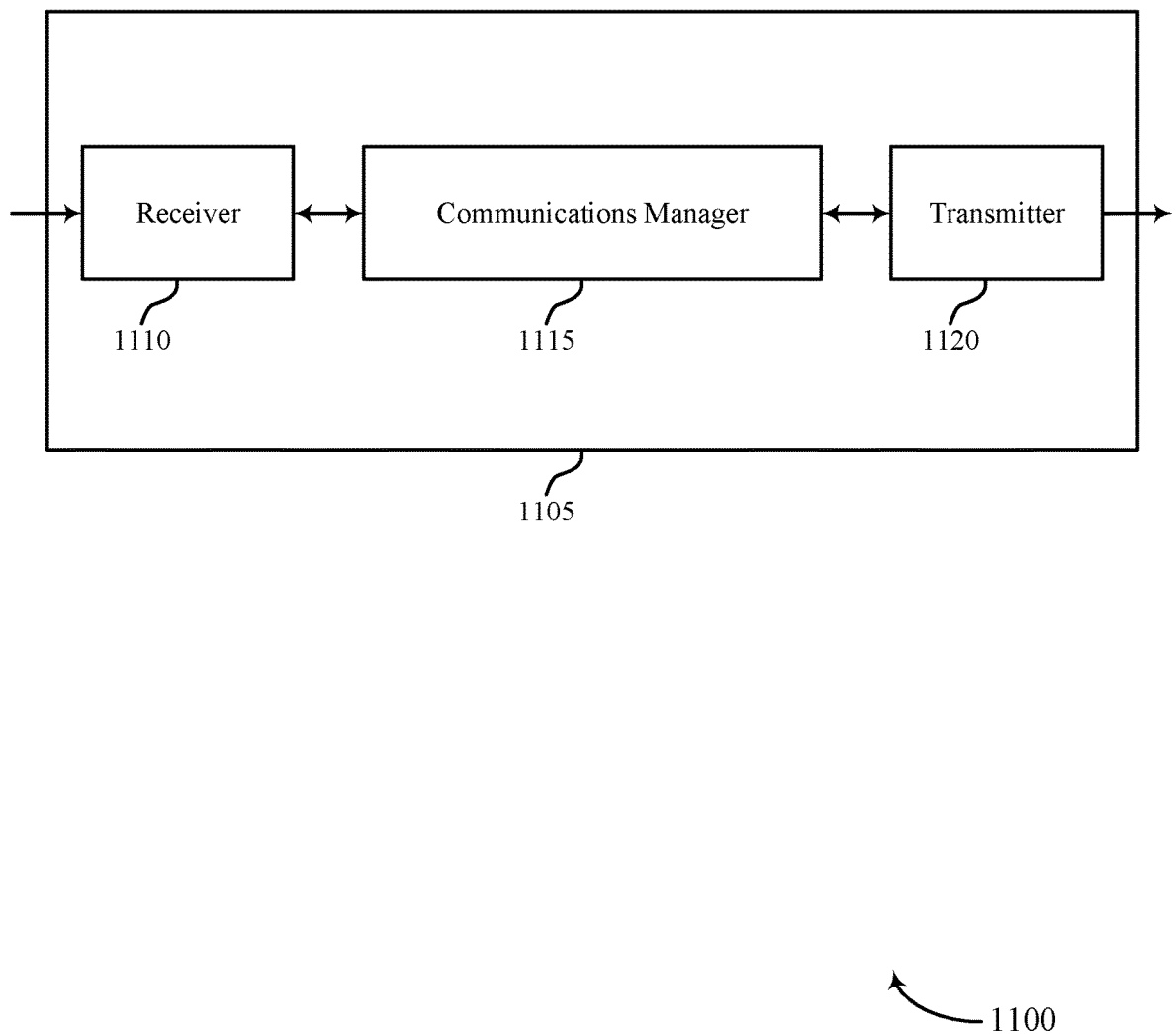
FIGS. 11 and 12 show block diagrams of devices that support transmission techniques over delay-doppler channels in accordance with aspects of the present disclosure.

FIG. 11 shows a block diagram 1100 of a device 1105 that supports transmission techniques over delay-doppler channels in accordance with aspects of the present disclosure. The device 1105 may be an example of aspects of a base station 105 or a UE 115 as described herein. The device 1105 may include a receiver 1110, a communications manager 1115, and a transmitter 1120. The device 1105 may also include a processor. Each of these components may be in communication with one another (e.g., via one or more buses). The components described with reference to the device 1105 may be utilized by a transmitting device that may be either a UE 115 or a base station 105.

The receiver 1110 may receive information such as packets, user data, or control information associated with various information channels (e.g., control channels, data channels, and information related to transmission techniques over delay-doppler channels, etc.). Information may be passed on to other components of the device 1105. The receiver 1110 may be an example of aspects of the transceiver 1420 described with reference to FIG. 14. The receiver 1110 may utilize a single antenna or a set of one or more antennas.

The communications manager 1115 may receive a stream of tones including modulated data symbols, partition the stream into one or more contiguous subsets of modulated data symbol tones, precode individual subsets of the one or more contiguous subsets of modulated data symbol tones so as to generate one or more precoded tone subsets, add one or more additional tones to the one or more precoded tone subsets so as to generate one or more expanded precoded tone subsets, map the one or more expanded precoded tone subsets to REs, generate a time-domain data stream based on the REs, and transmit the time-domain data stream. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communications manager 1115 in accordance with examples described herein, the device 1105 may support techniques for improved communication reliability, reduced latency, and enhanced spectral efficiency based on allowing wireless devices (e.g., UEs 115) to mitigate doppler spread using modified subsets of modulated data symbol tones.

Figure 12:
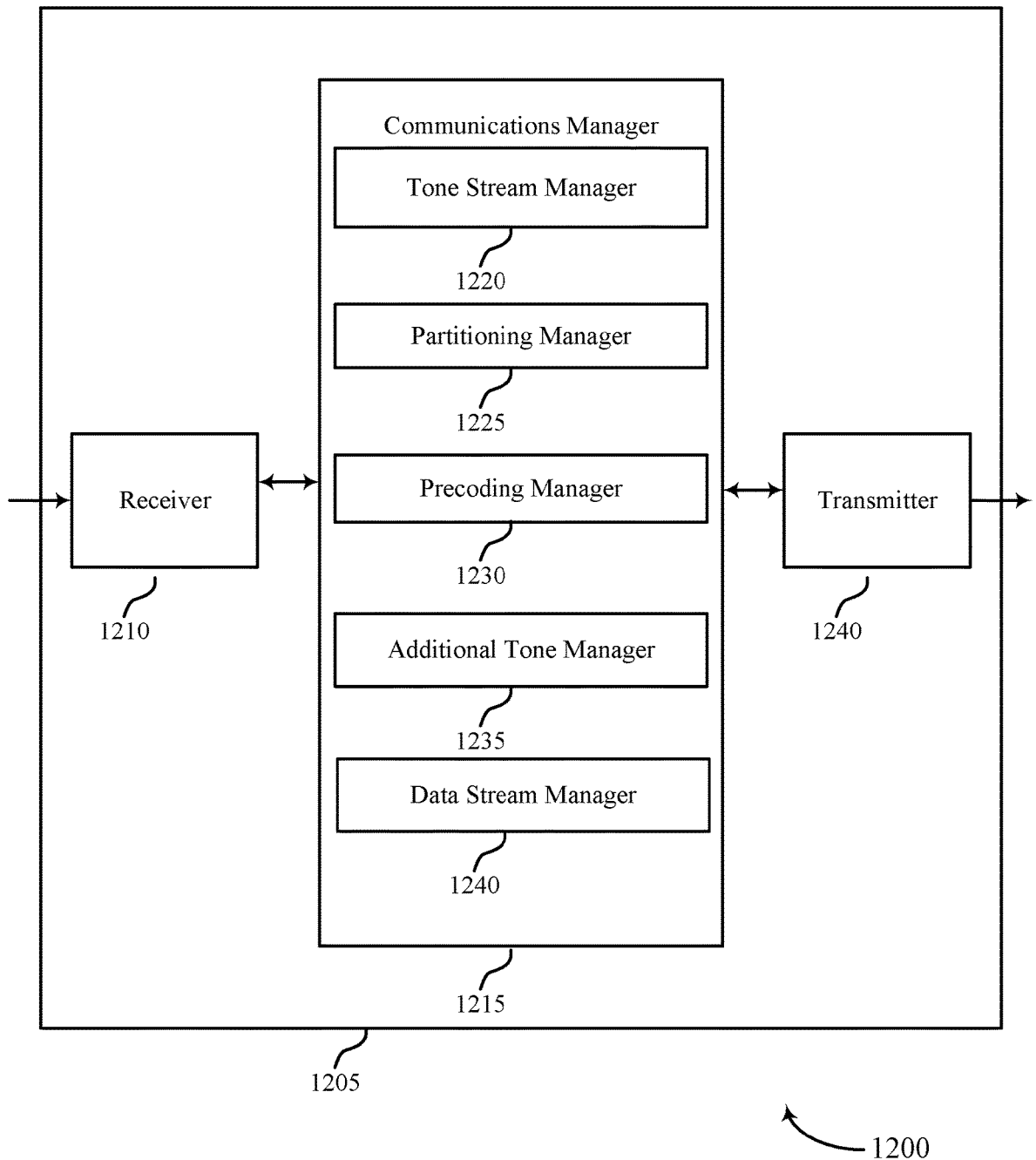

FIG. 12 shows a block diagram 1200 of a device 1205 that supports transmission techniques over delay-doppler channels in accordance with aspects of the present disclosure. The device 1205 may be an example of aspects of a device 1105, or a base station 105, or a UE 115 as described herein. The device 1205 may include a receiver 1210, a communications manager 1215, and a transmitter 1245. The device 1205 may also include a processor. Each of these components may be in communication with one another (e.g., via one or more buses). The components described with reference to the device 1205 may be utilized by a transmitting device that may be either a UE 115 or a base station 105.

The receiver 1210 may receive information such as packets, user data, or control information associated with various information channels (e.g., control channels, data channels, and information related to transmission techniques over delay-doppler channels, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a tone stream manager 1220, a partitioning manager 1225, a precoding manager 1230, an additional tone manager 1235, and a data stream manager 1240. The communications manager 1215 may be an example of aspects of the communications manager 1410 described herein.

The tone stream manager 1220 may receive a stream of tones including modulated data symbols.

The partitioning manager 1225 may partition the stream into one or more contiguous subsets of modulated data symbol tones.

The precoding manager 1230 may precode individual subsets of the one or more contiguous subsets of modulated data symbol tones so as to generate one or more precoded tone subsets.

The additional tone manager 1235 may add one or more additional tones to the one or more precoded tone subsets so as to generate one or more expanded precoded tone subsets.

The data stream manager 1240 may map the one or more expanded precoded tone subsets to REs, generate a time-domain data stream based on the REs, and transmit the time-domain data stream.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of one or more antennas.

Figure 13:
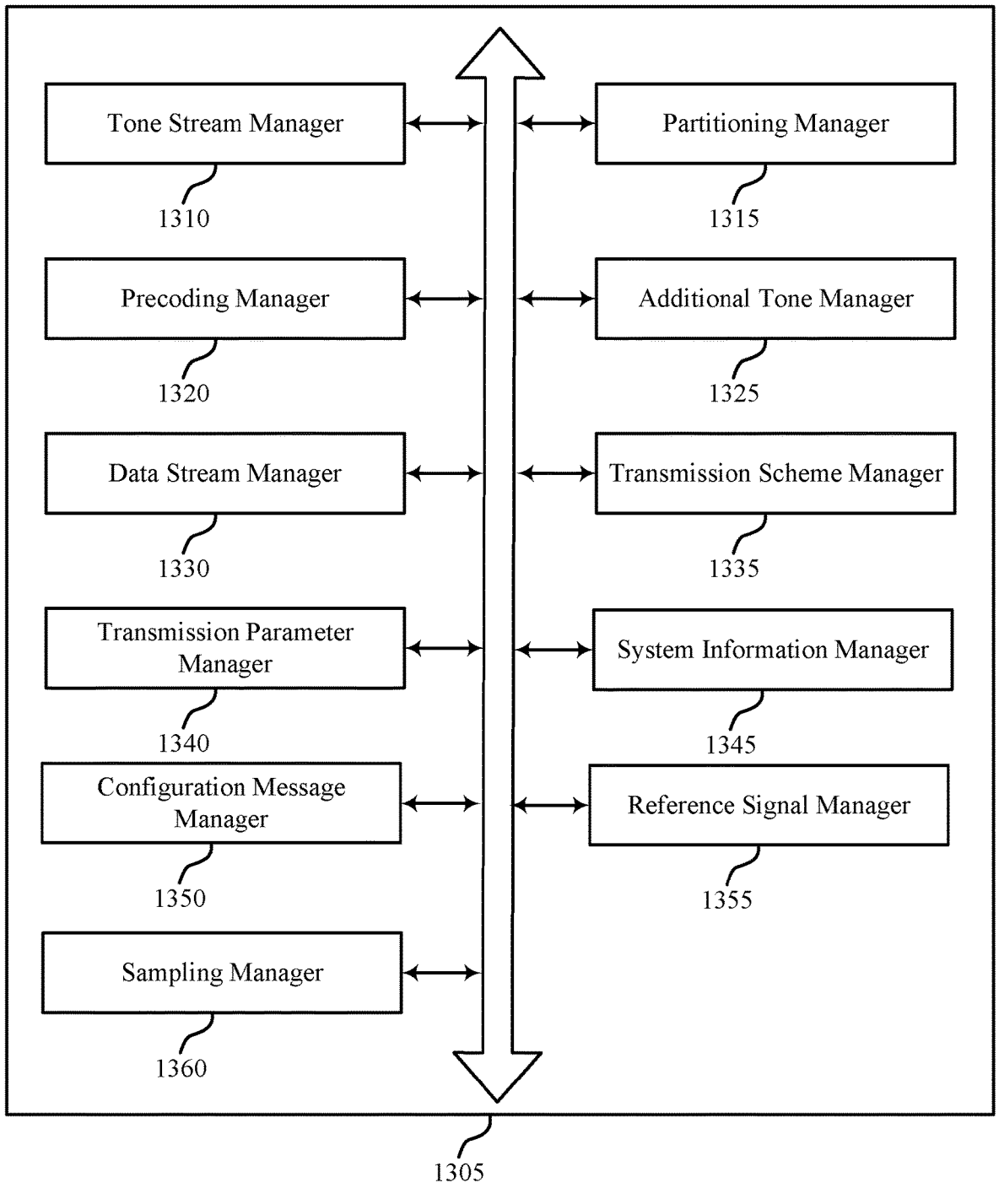
FIG. 13 shows a block diagram of a communications manager that supports transmission techniques over delay-doppler channels in accordance with aspects of the present disclosure.

FIG. 13 shows a block diagram 1300 of a communications manager 1305 that supports transmission techniques over delay-doppler channels in accordance with aspects of the present disclosure. The communications manager 1305 may be an example of aspects of a communications manager 1115, a communications manager 1215, or a communications manager 1410 described herein. The communications manager 1305 may include a tone stream manager 1310, a partitioning manager 1315, a precoding manager 1320, an additional tone manager 1325, a data stream manager 1330, a transmission scheme manager 1335, a transmission parameter manager 1340, a system information manager 1345, a configuration message manager 1350, a reference signal manager 1355, and a sampling manager 1360. Each of these modules may communicate, directly or indirectly, with one another (e.g., via one or more buses). The components described with reference to the communications manager 1305 may be utilized by a UE 115, or a base station 105.

The tone stream manager 1310 may receive a stream of tones including modulated data symbols.

In some examples, receiving a superposition of a first layer data stream and a second layer data stream. The generated time-domain data stream may include the first layer data stream and the second layer data stream.

The partitioning manager 1315 may partition the stream into one or more contiguous subsets of modulated data symbol tones. In some cases, a number of modulated data symbol tones in each subset of modulated data symbol tones is equal to a power of two. In some cases, a first subset of modulated data symbol tones or a last subset of modulated data symbol tones of the one or more contiguous subsets of modulated data symbol tones is a different size from the rest of the one or more contiguous subsets of modulated data symbol tones.

The precoding manager 1320 may precode individual subsets of the one or more contiguous subsets of modulated data symbol tones so as to generate one or more precoded tone subsets. In some examples, the precoding manager 1320 may precode the individual subsets according to one or more coding schemes. In some cases, the one or more coding schemes may include a discrete Fourier transform spreading operation, an identity matrix multiplication operation, or both.

The additional tone manager 1325 may add one or more additional tones to the one or more precoded tone subsets so as to generate one or more expanded precoded tone subsets. In some examples, the additional tone manager 1325 may generate at least one of a frequency-domain cyclic prefix or a frequency-domain cyclic postfix including the one or more additional tones for each expanded precoded tone subset of the one or more expanded precoded tone subsets. In some examples, the additional tone manager 1325 may add one or more unidirectional tones to the one or more precoded tone subsets, add one or more bidirectional tones to the one or more precoded tone subsets, interleave one or more tones with the one or more precoded tone subsets, or a combination thereof. In some cases, the one or more additional tones include null tones. In some cases, the one or more additional tones include pilot tones.

The data stream manager 1330 may map the one or more expanded precoded tone subsets to REs. In some examples, the data stream manager 1330 may generate a time-domain data stream based on the REs. In some examples, the data stream manager 1330 may transmit the time-domain data stream.

The transmission scheme manager 1335 may transmit, to a receiving wireless device, system information or control signaling including an indication that the transmitting wireless device is to use a transmission scheme that includes precoding individual subsets of the one or more contiguous subsets of modulated data symbol tones. In some cases, the transmission scheme includes a broadcast transmission scheme, where transmitting the data signal includes transmitting a broadcast signal to a set of one or more receiving devices. In some cases, the transmission scheme includes a unicast transmission scheme, where transmitting the data signal includes transmitting a unicast signal to a receiving device.

The transmission parameter manager 1340 may transmit, with the system information or control signaling, one or more transmission parameters for the transmission scheme. In some examples, (e.g., when the transmitting device is a UE 115), the transmission parameter manager 1340 may be an example of a parameter manager 925, as described with reference to FIG. 9. In such examples, the transmission parameter manager 1340 may receive control information including an indication of one or more transmission parameters for the precoding of the individual subsets of the one or more contiguous subsets of modulated data symbol tones. In some cases, the one or more transmission parameters include an indication of at least one of a number of the one or more contiguous subsets of modulated data symbol tones, an indication of the one or more additional tones, an indication of a signal structure or mapping associated with the one or more additional tones, an indication of the precoding to be used on the individual subsets of the one or more contiguous subsets of modulated data symbol tones, one or more reference signal locations, an indication of one or more transmission configurations, a configuration of superimposed data streams associated with the modulated data symbols, or a combination thereof. In some cases, the one or more transmission parameters are indicated via a bitmap or one of a set of one or more indices associated with pre-defined combinations of the one or more transmission parameters.

The system information manager 1345 may identify that an updated transmission parameter is to be used. In some examples, the system information manager 1345 may transmit a notification that the system information is to be updated based on the identification of the updated transmission parameter. In some examples, the system information manager 1345 may transmit the updated system information with the updated transmission parameter.

The configuration message manager 1350 may communicate, via a configuration message, an indication of one or more transmission parameters associated with a set of one or more TTIs. In some examples, communicating the configuration message includes transmitting the configuration message to a receiving device. In some examples, communicating the configuration message includes receiving the configuration message from the receiving device.

In some cases, the one or more transmission parameters include a coding scheme for the one or more precoded tone subsets, where precoding the individual subsets of the one or more contiguous subsets of modulated data symbol tones is based on the coding scheme. In some cases, the one or more transmission parameters include a number of superimposed data streams for each precoded tone subset of the one or more precoded tone subsets, and a power value for each of the superimposed data streams. In some cases, the one or more transmission parameters include different transmission parameters for different superimposed data streams. In some cases, the one or more transmission parameters vary over the set of one or more TTIs. In some cases, the configuration message includes a radio resource control message.

The reference signal manager 1355 may determine that one or more of the one or more contiguous subsets of modulated data symbol tones, the one or more additional tones, or both, includes one or more of a first type of reference signal tones, one or more of a second type of reference signal tones, or both, where the first type of reference signal tones are interleaved with modulated data symbol tones of a subset of modulated data symbol tones, and where the second type of reference signal tones includes at least one adjacent gap tone within a subset of modulated data symbol tones. In some cases, the presence of the first type of reference signal tones or the presence of the second type of reference signal tones, or both, in the contiguous subsets of modulated data symbol tones, the one or more additional tones, or both, is based on precoding the individual subsets of the one or more contiguous subsets of modulated data symbol tones using a first coding scheme, a second coding scheme, or both.

The sampling manager 1360 may sample appending at least one of a cyclic prefix, a pilot sample, a blank sample, or combinations thereof. In some examples, the sampling manager 1360 may refrain from sample appending.

Figure 14:
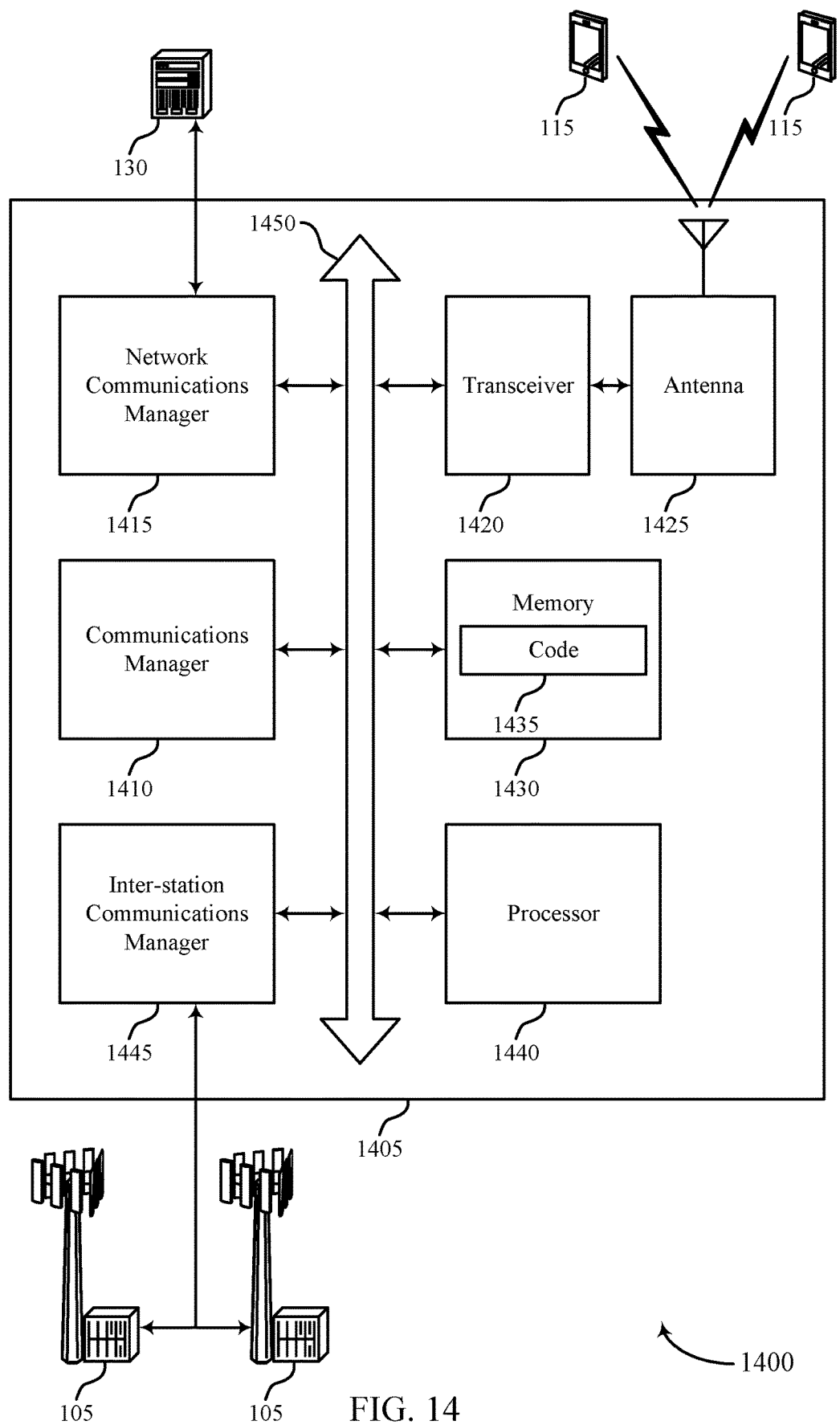
FIG. 14 shows a diagram of a system including a device that supports transmission techniques over delay-doppler channels in accordance with aspects of the present disclosure.

FIG. 14 shows a diagram of a system 1400 including a device 1405 that supports transmission techniques over delay-doppler channels in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive a stream of tones including modulated data symbols, partition the stream into one or more contiguous subsets of modulated data symbol tones, precode individual subsets of the one or more contiguous subsets of modulated data symbol tones so as to generate one or more precoded tone subsets, add one or more additional tones to the one or more precoded tone subsets so as to generate one or more expanded precoded tone subsets, map the one or more expanded precoded tone subsets to REs, generate a time-domain data stream based on the REs, and transmit the time-domain data stream.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmission techniques over delay-doppler channels).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
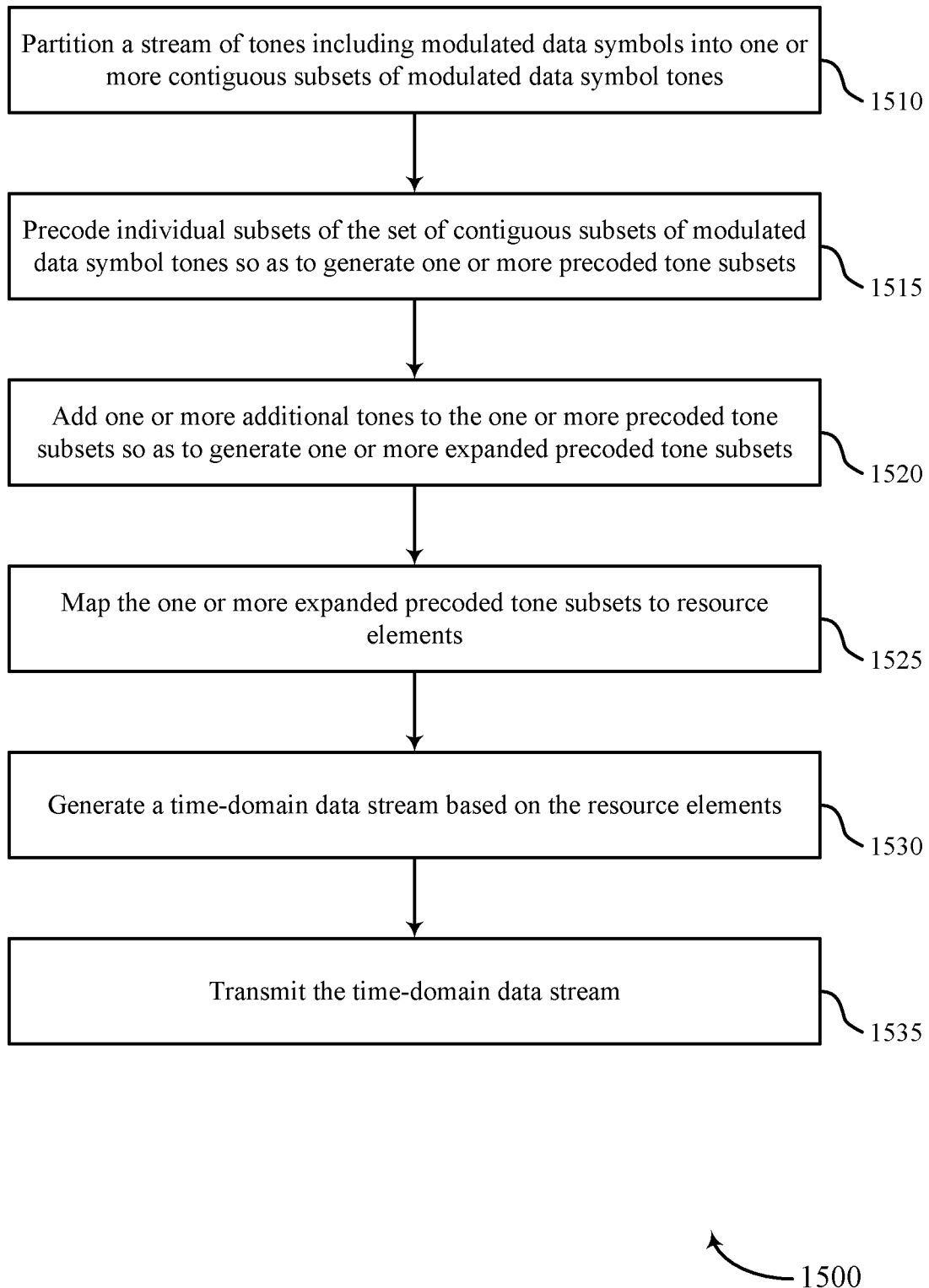
FIGS. 15 through 18 show flowcharts illustrating methods that support transmission techniques over delay-doppler channels in accordance with aspects of the present disclosure.

FIG. 15 shows a flowchart illustrating a method 1500 that supports transmission techniques over delay-doppler channels in accordance with aspects of the present disclosure. The operations of method 1500 may be implemented by a base station 105 or its components as described herein. For example, the operations of method 1500 may be performed by a communications manager as described with reference to FIGS. 11 through 14. In some examples, a base station may execute a set of one or more instructions to control the functional elements of the base station to perform the functions described herein. Additionally or alternatively, a base station may perform aspects of the functions described herein using special-purpose hardware.

At 1510, the base station may partition a stream of tones including modulated data symbols into one or more contiguous subsets of modulated data symbol tones. The operations of 1510 may be performed according to the methods described herein. In some examples, aspects of the operations of 1510 may be performed by a partitioning manager as described with reference to FIGS. 11 through 14.

At 1515, the base station may precode individual subsets of the one or more contiguous subsets of modulated data symbol tones so as to generate one or more precoded tone subsets. The operations of 1515 may be performed according to the methods described herein. In some examples, aspects of the operations of 1515 may be performed by a precoding manager as described with reference to FIGS. 11 through 14.

At 1520, the base station may add one or more additional tones to the one or more precoded tone subsets so as to generate one or more expanded precoded tone subsets. The operations of 1520 may be performed according to the methods described herein. In some examples, aspects of the operations of 1520 may be performed by an additional tone manager as described with reference to FIGS. 11 through 14.

At 1525, the base station may map the one or more expanded precoded tone subsets to REs. The operations of 1525 may be performed according to the methods described herein. In some examples, aspects of the operations of 1525 may be performed by a data stream manager as described with reference to FIGS. 11 through 14.

At 1530, the base station may generate a time-domain data stream based on the REs. The operations of 1530 may be performed according to the methods described herein. In some examples, aspects of the operations of 1530 may be performed by a data stream manager as described with reference to FIGS. 11 through 14.

At 1535, the base station may transmit the data stream. The operations of 1535 may be performed according to the methods described herein. In some examples, aspects of the operations of 1535 may be performed by a data stream manager as described with reference to FIGS. 11 through 14.

Figure 16:
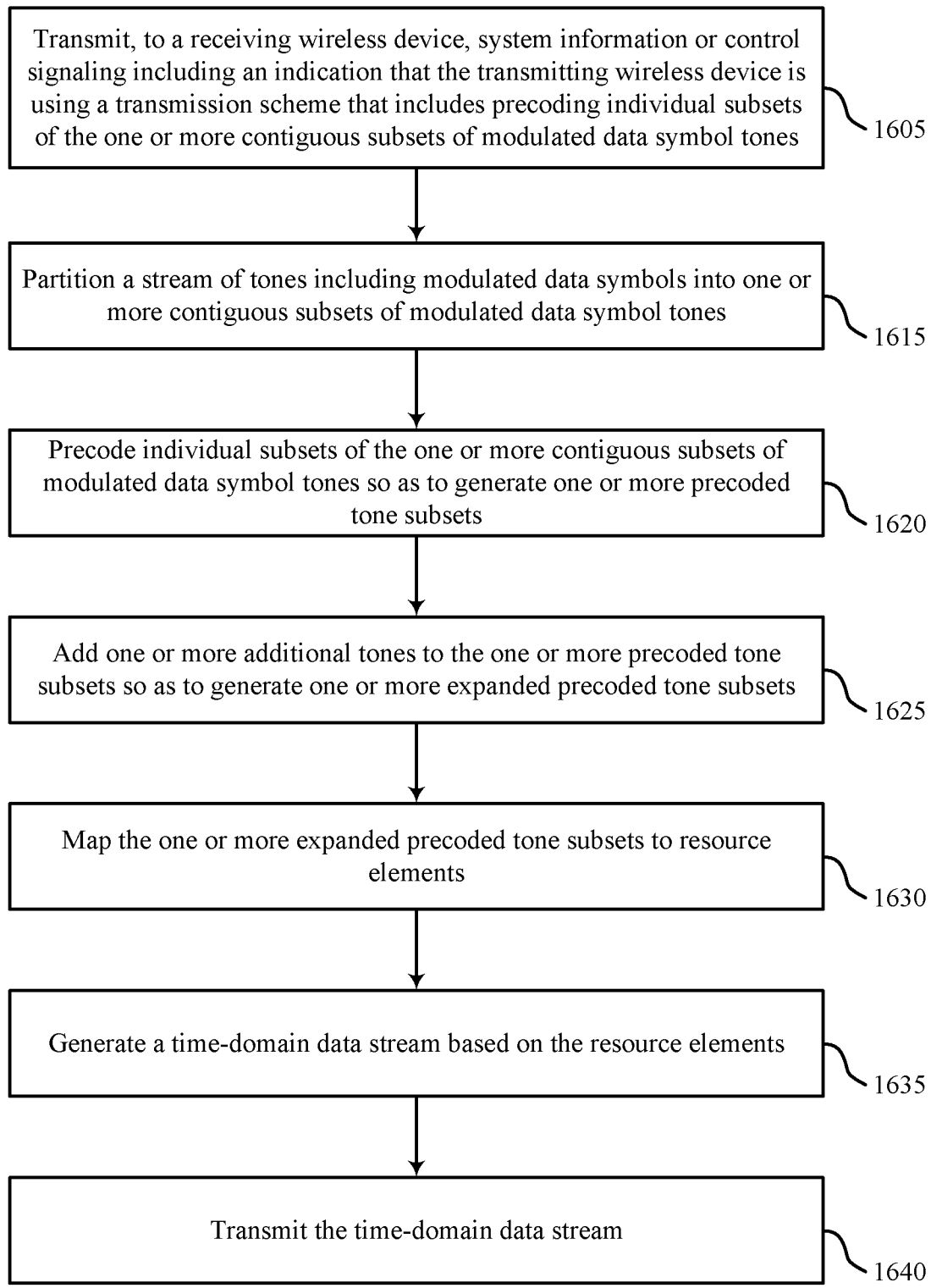

FIG. 16 shows a flowchart illustrating a method 1600 that supports transmission techniques over delay-doppler channels in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of one or more instructions to control the functional elements of the base station to perform the functions described herein. Additionally or alternatively, a base station may perform aspects of the functions described herein using special-purpose hardware.

At 1605, the base station may transmit, to a receiving wireless device, system information or control signaling including an indication that the transmitting wireless device is to use a transmission scheme that includes precoding individual subsets of the one or more contiguous subsets of modulated data symbol tones. The operations of 1605 may be performed according to the methods described herein. In some examples, aspects of the operations of 1605 may be performed by a transmission scheme manager as described with reference to FIGS. 11 through 14.

At 1615, the base station may partition a stream of tones including modulated data symbols into one or more contiguous subsets of modulated data symbol tones. The operations of 1615 may be performed according to the methods described herein. In some examples, aspects of the operations of 1615 may be performed by a partitioning manager as described with reference to FIGS. 11 through 14.

At 1620, the base station may precode individual subsets of the one or more contiguous subsets of modulated data symbol tones so as to generate one or more precoded tone subsets. The operations of 1620 may be performed according to the methods described herein. In some examples, aspects of the operations of 1620 may be performed by a precoding manager as described with reference to FIGS. 11 through 14.

At 1625, the base station may add one or more additional tones to the one or more precoded tone subsets so as to generate one or more expanded precoded tone subsets. The operations of 1625 may be performed according to the methods described herein. In some examples, aspects of the operations of 1625 may be performed by an additional tone manager as described with reference to FIGS. 11 through 14.

At 1630, the base station may map the one or more expanded precoded tone subsets to REs. The operations of 1630 may be performed according to the methods described herein. In some examples, aspects of the operations of 1630 may be performed by a data stream manager as described with reference to FIGS. 11 through 14.

At 1635, the base station may generate a time-domain data stream based on the REs. The operations of 1635 may be performed according to the methods described herein. In some examples, aspects of the operations of 1635 may be performed by a data stream manager as described with reference to FIGS. 11 through 14.

At 1640, the base station may transmit the time-domain data stream. The operations of 1640 may be performed according to the methods described herein. In some examples, aspects of the operations of 1640 may be performed by a data stream manager as described with reference to FIGS. 11 through 14.

Figure 17:
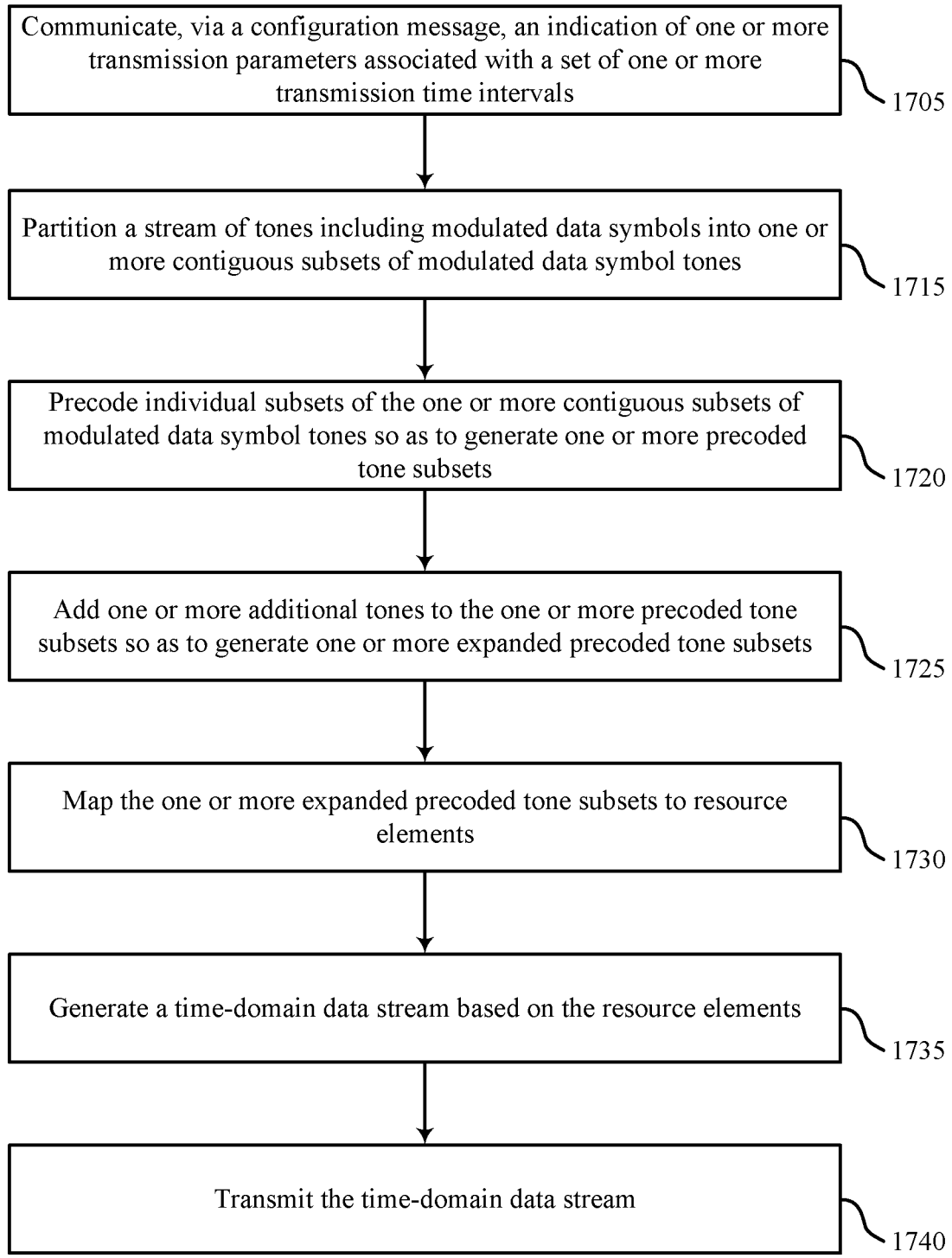

FIG. 17 shows a flowchart illustrating a method 1700 that supports transmission techniques over delay-doppler channels in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of one or more instructions to control the functional elements of the base station to perform the functions described herein. Additionally or alternatively, a base station may perform aspects of the functions described herein using special-purpose hardware.

At 1705, the base station may communicate, via a configuration message, an indication of one or more transmission parameters associated with a set of one or more TTIs. The operations of 1705 may be performed according to the methods described herein. In some examples, aspects of the operations of 1705 may be performed by a configuration message manager as described with reference to FIGS. 11 through 14.

At 1715, the base station may partition a stream of tones including modulated data symbols into one or more contiguous subsets of modulated data symbol tones. The operations of 1715 may be performed according to the methods described herein. In some examples, aspects of the operations of 1715 may be performed by a partitioning manager as described with reference to FIGS. 11 through 14.

At 1720, the base station may precode individual subsets of the one or more contiguous subsets of modulated data symbol tones so as to generate one or more precoded tone subsets. The operations of 1720 may be performed according to the methods described herein. In some examples, aspects of the operations of 1720 may be performed by a precoding manager as described with reference to FIGS. 11 through 14.

At 1725, the base station may add one or more additional tones to one or more of the one or more precoded tone subsets so as to generate one or more expanded precoded tone subsets. The operations of 1725 may be performed according to the methods described herein. In some examples, aspects of the operations of 1725 may be performed by an additional tone manager as described with reference to FIGS. 11 through 14.

At 1730, the base station may map the one or more expanded precoded tone subsets to REs. The operations of 1730 may be performed according to the methods described herein. In some examples, aspects of the operations of 1730 may be performed by a data stream manager as described with reference to FIGS. 11 through 14.

At 1735, the base station may generate a time-domain data stream based on the REs. The operations of 1735 may be performed according to the methods described herein. In some examples, aspects of the operations of 1735 may be performed by a data stream manager as described with reference to FIGS. 11 through 14.

At 1740, the base station may transmit the time-domain data stream. The operations of 1740 may be performed according to the methods described herein. In some examples, aspects of the operations of 1740 may be performed by a data stream manager as described with reference to FIGS. 11 through 14.

Figure 18:
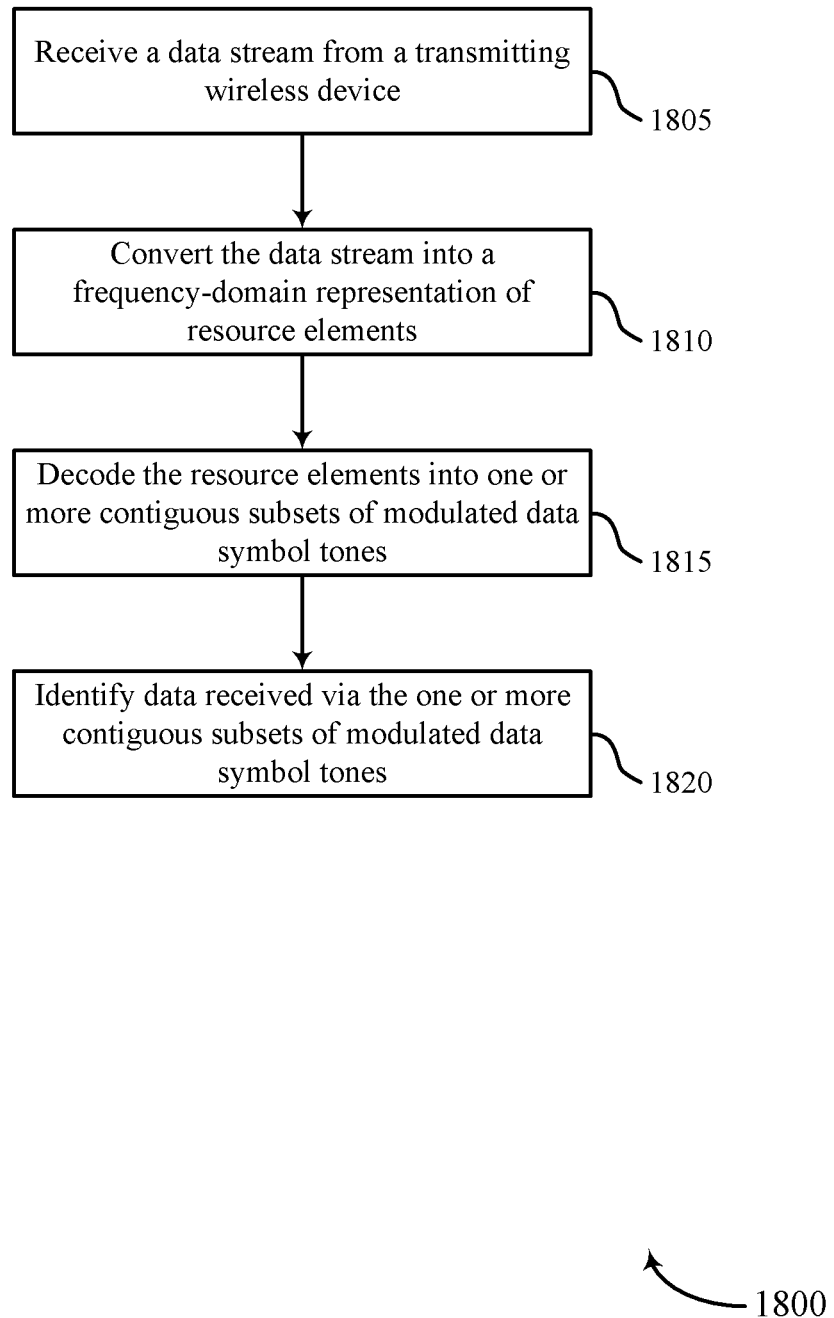

FIG. 18 shows a flowchart illustrating a method 1800 that supports transmission techniques over delay-doppler channels in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of one or more instructions to control the functional elements of the UE to perform the functions described herein. Additionally or alternatively, a UE may perform aspects of the functions described herein using special-purpose hardware.

At 1805, the UE may receive a data stream from a transmitting wireless device. The operations of 1805 may be performed according to the methods described herein. In some examples, aspects of the operations of 1805 may be performed by a data stream manager as described with reference to FIGS. 7 through 10.

At 1810, the UE may convert the data stream into a frequency-domain representation of REs. The operations of 1810 may be performed according to the methods described herein. In some examples, aspects of the operations of 1810 may be performed by a data stream manager as described with reference to FIGS. 7 through 10.

At 1815, the UE may decode the REs into one or more contiguous subsets of modulated data symbol tones. The operations of 1815 may be performed according to the methods described herein. In some examples, aspects of the operations of 1815 may be performed by a decoding manager as described with reference to FIGS. 7 through 10.

At 1820, the UE may identify data received via one or more of the one or more contiguous subsets of modulated data symbol tones. The operations of 1820 may be performed according to the methods described herein. In some examples, aspects of the operations of 1820 may be performed by a data stream manager as described with reference to FIGS. 7 through 10.

The following provides an overview of aspects of the present disclosure:

Aspect 1: A method for wireless communications at a transmitting wireless device, comprising: partitioning a stream of tones comprising modulated data symbols into one or more contiguous subsets of modulated data symbol tones; precoding individual subsets of the one or more contiguous subsets of modulated data symbol tones so as to generate one or more precoded tone subsets; adding one or more additional tones to the one or more precoded tone subsets so as to generate one or more expanded precoded tone subsets; mapping the one or more expanded precoded tone subsets to REs; generating a time-domain data stream based on the REs; and transmitting the time-domain data stream.

Aspect 2: The method of aspect 1, further comprising: transmitting, to a receiving wireless device, system information or control signaling comprising an indication that the transmitting wireless device is to use a transmission scheme that comprises precoding individual subsets of the one or more contiguous subsets of modulated data symbol tones.

Aspect 3: The method of aspect 2, further comprising: transmitting, with the system information or control signaling, one or more transmission parameters for the transmission scheme.

Aspect 4: The method of aspect 3, wherein the one or more transmission parameters comprise an indication of at least one of a number of the one or more contiguous subsets of modulated data symbol tones, an indication of the one or more additional tones, an indication of the signal structure or mapping associated with the one or more additional tones, an indication of the precoding to be used on the individual subsets of the one or more contiguous subsets of modulated data symbol tones, one or more reference signal locations, an indication of one or more transmission configurations, a configuration of superimposed data streams associated with the modulated data symbols, or a combination thereof.

Aspect 5: The method of any of aspects 3 through 4, further comprising: identifying that an updated transmission parameter is to be used; transmitting a notification that the system information is to be updated based on the identification of the updated transmission parameter; and transmitting the updated system information with the updated transmission parameter.

Aspect 6: The method of any of aspects 3 through 5, wherein the one or more transmission parameters are indicated via a bitmap or one of a plurality of indices associated with pre-defined combinations of the one or more transmission parameters.

Aspect 7: The method of any of aspects 2 through 6, wherein the transmission scheme comprises a broadcast transmission scheme, transmitting the data signal comprises transmitting a broadcast signal to a set of one or more receiving devices.

Aspect 8: The method of any of aspects 2 through 7, wherein the transmission scheme comprises a unicast transmission scheme, wherein transmitting the data signal comprises transmitting a unicast signal to a receiving device.

Aspect 9: The method of any of aspects 1 through 8, further comprising: receiving control information comprising an indication of one or more transmission parameters for processing of the stream of tones.

Aspect 10: The method of any of aspects 1 through 9, further comprising: communicating, via a configuration message, an indication of one or more transmission parameters associated with a set of one or more TTIs.

Aspect 11: The method of aspect 10, wherein communicating the configuration message comprises transmitting the configuration message to a receiving device.

Aspect 12: The method of any of aspects 10 through 11, wherein communicating the configuration message comprises receiving the configuration message from the receiving device.

Aspect 13: The method of any of aspects 10 through 12, wherein the one or more transmission parameters comprise a coding scheme for the one or more precoded tone subsets, wherein precoding the individual subsets of the one or more contiguous subsets of modulated data symbol tones is based at least in part on the coding scheme.

Aspect 14: The method of any of aspects 10 through 13, wherein the one or more transmission parameters comprise a number of superimposed data streams for each precoded tone subset of the one or more precoded tone subsets, and a power value for each of the superimposed data streams.

Aspect 15: The method of aspect 14, wherein the one or more transmission parameters comprise different transmission parameters for different superimposed data streams.

Aspect 16: The method of aspect 15, wherein the different transmission parameters for different superimposed data streams are determined based at least in part on a coding scheme associated with each precoded tone subset of the one or more precoded tone subsets.

Aspect 17: The method of any of aspects 10 through 16, wherein the one or more transmission parameters vary over the set of one or more TTIs.

Aspect 18: The method of any of aspects 10 through 17, wherein the configuration message comprises an RRC message.

Aspect 19: The method of any of aspects 1 through 18, wherein adding the one or more additional tones comprises: generating at least one of a frequency-domain cyclic prefix or a frequency-domain cyclic postfix comprising the one or more additional tones for each expanded precoded tone subset of the one or more expanded precoded tone subsets.

Aspect 20: The method of any of aspects 1 through 19, wherein the one or more additional tones comprise null tones.

Aspect 21: The method of any of aspects 1 through 20, wherein the one or more additional tones comprise pilot tones.

Aspect 22: The method of any of aspects 1 through 21, wherein a number of modulated data symbol tones in each subset of modulated data symbol tones is equal to a power of two.

Aspect 23: The method of any of aspects 1 through 22, wherein a first subset of modulated data symbol tones or a last subset of modulated data symbol tones of the one or more contiguous subsets of modulated data symbol tones is a different size than the rest of the subsets of modulated data symbol tones of the one or more contiguous subsets of modulated data symbol tones.

Aspect 24: The method of any of aspects 1 through 23, wherein precoding the individual subsets of the one or more contiguous subsets of modulated data symbol tones comprises: precoding a first set of individual subsets according to one or more coding schemes.

Aspect 25: The method of aspect 24, wherein the one or more coding schemes comprise a DFT spreading operation, an identity matrix multiplication operation, or both.

Aspect 26: The method of any of aspects 1 through 25, wherein adding the one or more additional tones to the one or more precoded tone subsets comprises: adding one or more unidirectional tones to the one or more precoded tone subsets, or adding one or more bidirectional tones to the one or more precoded tone subsets, interleaving one or more tones with the one or more precoded tone subsets, or a combination thereof.

Aspect 27: The method of any of aspects 1 through 26, wherein mapping the one or more expanded precoded tone subsets to REs comprises: applying an offset value which is based at least in part on a symbol or slot index.

Aspect 28: The method of any of aspects 1 through 27, wherein the one or more contiguous subsets of modulated data symbol tones, the one or more additional tones, or both, comprises one or more of a first type of reference signal tones, one or more of a second type of reference signal tones, or both, the first type of reference signal tones are interleaved with modulated data symbol tones of a subset of modulated data symbol tones, and the second type of reference signal tones comprises at least one adjacent gap tone within a subset of modulated data symbol tones.

Aspect 29: The method of aspect 28, wherein the presence of the first type of reference signal tones or the presence of the second type of reference signal tones, or both, in the contiguous subsets of modulated data symbol tones, the one or more additional tones, or both, is based at least in part on precoding the individual subsets of the one or more contiguous subsets of modulated data symbol tones using a first coding scheme, a second coding scheme, or both.

Aspect 30: The method of aspect 29, wherein the first coding scheme comprises a DFT spreading operation, and the second coding scheme comprises an identity matrix multiplication operation.

Aspect 31: The method of any of aspects 1 through 30, wherein receiving the stream of tones comprising the modulated data symbols comprises: receiving a superposition of a first layer data stream and a second layer data stream.

Aspect 32: The method of any of aspects 1 through 31, wherein generating the time-domain data stream based on the REs comprises: sample appending at least one of a cyclic prefix, a pilot sample, a blank sample, or combinations thereof.

Aspect 33: The method of any of aspects 1 through 32, wherein generating the time-domain data stream based on the REs comprises: refraining from sample appending.

Aspect 34: A method for wireless communications at a receiving wireless device, comprising: receiving a time-domain data stream from a transmitting wireless device; converting the time-domain data stream into a frequency-domain representation of REs; decoding the REs into one or more contiguous subsets of modulated data symbol tones; and identifying data received via the one or more contiguous subsets of modulated data symbol tones.

Aspect 35: The method of aspect 34, further comprising: receiving, from the transmitting wireless device, system information or control signaling comprising an indication that the transmitting wireless device is to use a transmission scheme that comprises precoding individual subsets of the one or more contiguous subsets of modulated data symbol tones.

Aspect 36: The method of aspect 35, further comprising: receiving, with the system information or control signaling, one or more transmission parameters for the transmission scheme.

Aspect 37: The method of aspect 36, wherein the one or more transmission parameters comprise an indication of at least one of a number of the one or more contiguous subsets of modulated data symbol tones, an indication of one or more additional tones added to the one or more contiguous subsets of modulated data symbol tones, an indication of the signal structure or mapping associated with the one or more additional tones, an indication of precoding used on the one or more contiguous subsets of modulated data symbol tones, one or more reference signal locations, an indication of one or more transmission configurations, a configuration of superimposed data streams associated with the modulated data symbols, or a combination thereof.

Aspect 38: The method of any of aspects 36 through 37, further comprising: receiving a notification that the system information is to be updated in order to receive an updated transmission parameter; and receiving the updated system information with the updated transmission parameter.

Aspect 39: The method of any of aspects 36 through 38, wherein the one or more transmission parameters are indicated via a bitmap or one of a plurality of indices associated with pre-defined combinations of the one or more transmission parameters.

Aspect 40: The method of any of aspects 35 through 39, wherein the transmission scheme comprises a broadcast transmission scheme, wherein transmitting the data signal comprises transmitting a broadcast signal to a set of one or more receiving devices.

Aspect 41: The method of any of aspects 35 through 40, wherein the transmission scheme comprises a unicast transmission scheme, wherein transmitting the data signal comprises transmitting a unicast signal to a receiving device.

Aspect 42: The method of any of aspects 34 through 41, further comprising: transmitting control signaling comprising an indication of one or more transmission parameters for precoding the individual subsets of the one or more contiguous subsets of modulated data symbols, wherein decoding the REs into the one or more contiguous subsets of modulated data symbol tones is based at least in part on the indication of the one or more transmission parameters.

Aspect 43: The method of any of aspects 34 through 42, further comprising: communicating, via a configuration message, an indication of one or more transmission parameters associated with a set of one or more TTIs.

Aspect 44: The method of aspect 43, wherein communicating the configuration message comprises receiving the configuration message from a transmitting device.

Aspect 45: The method of any of aspects 43 through 44, wherein communicating the configuration message comprises receiving the configuration message from a transmitting device.

Aspect 46: The method of any of aspects 43 through 45, wherein the one or more transmission parameters comprise a coding scheme used for precoding individual subsets of the one or more contiguous subsets of modulated data symbol tones into one or more precoded tone subsets.

Aspect 47: The method of any of aspects 43 through 46, wherein the one or more transmission parameters comprise a number of superimposed data streams for each precoded tone subset of the one or more precoded tone subsets, and a power value for each of the superimposed data streams.

Aspect 48: The method of aspect 47, wherein the one or more transmission parameters comprise different transmission parameters for different superimposed data streams.

Aspect 49: The method of aspect 48, wherein the different transmission parameters for different superimposed data streams are determined based at least in part on a coding scheme associated with each precoded tone subset of the one or more precoded tone subsets.

Aspect 50: The method of any of aspects 43 through 49, wherein the one or more transmission parameters vary over the set of one or more TTIs.

Aspect 51: The method of any of aspects 43 through 50, wherein the configuration message comprises an RRC message.

Aspect 52: The method of any of aspects 34 through 51, wherein receiving the time-domain data stream from the transmitting wireless device comprises: detecting the data stream via frequency-domain equalization when the receiving wireless device is using a first numerology or via time-domain equalization when the receiving wireless device is using a second numerology, wherein the first numerology comprises a smaller subcarrier spacing and a larger cyclic prefix than the second numerology.

Aspect 53: An apparatus for wireless communications at a transmitting wireless device, comprising a processor; memory coupled with the processor; and instructions stored in the memory and executable by the processor to cause the apparatus to perform a method of any of aspects 1 through 33.

Aspect 54: An apparatus for wireless communications at a transmitting wireless device, comprising at least one means for performing a method of any of aspects 1 through 33.

Aspect 55: A non-transitory computer-readable medium storing code for wireless communications at a transmitting wireless device, the code comprising instructions executable by a processor to perform a method of any of aspects 1 through 33.

Aspect 56: An apparatus for wireless communications at a receiving wireless device, comprising a processor; memory coupled with the processor; and instructions stored in the memory and executable by the processor to cause the apparatus to perform a method of any of aspects 34 through 52.

Aspect 57: An apparatus for wireless communications at a receiving wireless device, comprising at least one means for performing a method of any of aspects 34 through 52.

Aspect 58: A non-transitory computer-readable medium storing code for wireless communications at a receiving wireless device, the code comprising instructions executable by a processor to perform a method of any of aspects 34 through 52.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of one or more conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting wireless device, comprising:

partitioning a stream of tones comprising modulated data symbols into one or more contiguous subsets of modulated data symbol tones;

precoding individual subsets of the one or more contiguous subsets of modulated data symbol tones so as to generate one or more precoded tone subsets;

adding one or more additional tones to the one or more precoded tone subsets so as to generate one or more expanded precoded tone subsets;

mapping the one or more expanded precoded tone subsets to resource elements;

generating a time-domain data stream based on the resource elements; and transmitting the time-domain data stream.

2. The method of claim 1, further comprising:

transmitting, to a receiving wireless device, system information or control signaling comprising an indication that the transmitting wireless device is to use a transmission scheme that comprises precoding individual subsets of the one or more contiguous subsets of modulated data symbol tones.

3. The method of claim 2, further comprising:

transmitting, with the system information or control signaling, one or more transmission parameters for the transmission scheme.

4. The method of claim 3, wherein the one or more transmission parameters comprise an indication of at least one of a number of the one or more contiguous subsets of modulated data symbol tones, an indication of the one or more additional tones, an indication of a signal structure or mapping associated with the one or more additional tones, an indication of the precoding to be used on the individual subsets of the one or more contiguous subsets of modulated data symbol tones, one or more reference signal locations, an indication of one or more transmission configurations, a configuration of superimposed data streams associated with the modulated data symbols, or a combination thereof.

5. The method of claim 2, wherein the transmission scheme comprises a broadcast transmission scheme, wherein transmitting the time-domain data stream comprises transmitting a broadcast signal to a set of one or more receiving devices.

6. The method of claim 2, wherein the transmission scheme comprises a unicast transmission scheme, wherein transmitting the time-domain data stream comprises transmitting a unicast signal to a receiving device.

7. The method of claim 3, further comprising:
identifying that an updated transmission parameter is to be used;
transmitting a notification that the system information is to be updated based on the identification of the updated transmission parameter;
transmitting the updated system information with the updated transmission parameter.

8. The method of claim 3, wherein the one or more transmission parameters are indicated via a bitmap or one of a plurality of indices associated with pre-defined combinations of the one or more transmission parameters.

9. The method of claim 1, further comprising:
receiving control information comprising an indication of one or more transmission parameters for processing of the stream of tones.

10. The method of claim 1, further comprising:
communicating, via a configuration message, an indication of one or more transmission parameters associated with a set of one or more transmission time intervals.

11. The method of claim 10, wherein communicating the configuration message comprises transmitting the configuration message to a receiving device.

12. The method of claim 10, wherein communicating the configuration message comprises receiving the configuration message from a receiving device.

13. The method of claim 10, wherein the one or more transmission parameters comprise a coding scheme for the one or more precoded tone subsets, wherein precoding the individual subsets of the one or more contiguous subsets of modulated data symbol tones is based at least in part on the coding scheme.

14. The method of claim 10, wherein the one or more transmission parameters comprise a number of superimposed data streams for each precoded tone subset of the one or more precoded tone subsets, and a power value for each of the number of superimposed data streams.

15. The method of claim 14, wherein the one or more transmission parameters comprise different transmission parameters for different superimposed data streams.

16. The method of claim 15, wherein the different transmission parameters for different superimposed data streams are determined based at least in part on a coding scheme associated with each precoded tone subset of the one or more precoded tone subsets.

17. The method of claim 10, wherein the one or more transmission parameters vary over the set of one or more transmission time intervals.

18. The method of claim 10, wherein the configuration message comprises a radio resource control message.

19. The method of claim 1, wherein adding the one or more additional tones comprises:

generating at least one of a frequency-domain cyclic prefix or a frequency-domain cyclic postfix comprising the one or more additional tones for each expanded precoded tone subset of the one or more expanded precoded tone subsets.

20. The method of claim 1, wherein the one or more additional tones comprise null tones.

21. The method of claim 1, wherein the one or more additional tones comprise pilot tones.

22. The method of claim 1, wherein a number of modulated data symbol tones in each subset of modulated data symbol tones is equal to a power of two.

23. The method of claim 1, wherein a first subset of modulated data symbol tones or a last subset of modulated data symbol tones of the one or more contiguous subsets of modulated data symbol tones is a different size from the rest of the one or more contiguous subsets of modulated data symbol tones.

24. The method of claim 1, wherein precoding the individual subsets of the one or more contiguous subsets of modulated data symbol tones comprises:
precoding the individual subsets according to one or more coding schemes.

25. The method of claim 24, wherein the one or more coding schemes comprise a discrete Fourier transform spreading operation, an identity matrix multiplication operation, or both.

26. The method of claim 1, wherein adding the one or more additional tones to the one or more precoded tone subsets comprises:
adding one or more unidirectional tones to the one or more precoded tone subsets, or adding one or more bidirectional tones to the one or more precoded tone subsets, interleaving one or more tones with the one or more precoded tone subsets, or a combination thereof.

27. The method of claim 1, wherein mapping the one or more expanded precoded tone subsets to resource elements comprises:
applying an offset value which is based at least in part on a symbol or slot index.

28. An apparatus for wireless communications at a transmitting wireless device, comprising:
a processor,
memory coupled with the processor; and
instructions stored in the memory and executable by the processor to cause the apparatus to:
partition a stream of tones comprising modulated data symbols into one or more contiguous subsets of modulated data symbol tones;
precode individual subsets of the one or more contiguous subsets of modulated data symbol tones so as to generate one or more precoded tone subsets;
add one or more additional tones to the one or more precoded tone subsets so as to generate one or more expanded precoded tone subsets;
map the one or more expanded precoded tone subsets to resource elements;
generate a time-domain data stream based on the resource elements; and
transmit the time-domain data stream.

29. An apparatus for wireless communications at a transmitting wireless device, comprising:
means for partitioning a stream of tones comprising modulated data symbols into one or more contiguous subsets of modulated data symbol tones;

means for precoding individual subsets of the one or more contiguous subsets of modulated data symbol tones so as to generate one or more precoded tone subsets;

means for adding one or more additional tones to the one or more precoded tone subsets so as to generate one or more expanded precoded tone subsets;

means for mapping the one or more expanded precoded tone subsets to resource elements;

means for generating a time-domain data stream based on the resource elements; and means for transmitting the time-domain data stream.

30. A non-transitory computer-readable medium storing code for wireless communications at a transmitting wireless device, the code comprising instructions executable by a processor to:

partition a stream of tones comprising modulated data symbols into one or more contiguous subsets of modulated data symbol tones;

precode individual subsets of the one or more contiguous subsets of modulated data symbol tones so as to generate one or more precoded tone subsets;

add one or more additional tones to the one or more precoded tone subsets so as to generate one or more expanded precoded tone subsets;

map the one or more expanded precoded tone subsets to resource elements;

generate a time-domain data stream based on the resource elements; and transmit the time-domain data stream.

\* \* \* \* \*